US010652108B2

(12) United States Patent
Guim Bernat

(10) Patent No.: US 10,652,108 B2
(45) Date of Patent: May 12, 2020

(54) TECHNIQUES TO ESTABLISH SERVICE LEVEL AGREEMENTS OR QUALITY OF SERVICE FOR REMOTELY ACCESSIBLE STORAGE DEVICES

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 15/721,460

(22) Filed: Sep. 29, 2017

(65) Prior Publication Data

US 2019/0104029 A1 Apr. 4, 2019

(51) Int. Cl.
*G06F 15/173* (2006.01)
*H04L 12/24* (2006.01)
*H04L 29/08* (2006.01)

(52) U.S. Cl.
CPC ...... *H04L 41/5003* (2013.01); *H04L 41/0896* (2013.01); *H04L 41/5006* (2013.01); *H04L 41/5022* (2013.01); *H04L 67/1097* (2013.01)

(58) Field of Classification Search
USPC ....... 709/203, 206, 217, 219, 223, 224, 226, 709/228, 230, 232, 238; 370/216, 235; 455/452.1
See application file for complete search history.

(56) References Cited

U.S. PATENT DOCUMENTS

| | | | |
|---|---|---|---|
| 2008/0014956 A1* | 1/2008 | Balasubramanian | ........................ H04L 41/0806 455/452.1 |
| 2011/0211439 A1* | 9/2011 | Manpuria | ............. H04W 76/18 370/216 |
| 2011/0314145 A1* | 12/2011 | Raleigh | ............... H04L 41/0893 709/224 |
| 2014/0140213 A1* | 5/2014 | Raleigh | ............... H04L 67/2804 370/235 |
| 2017/0324813 A1* | 11/2017 | Jain | ..................... H04L 41/5009 |
| 2018/0332442 A1* | 11/2018 | Shaw | ..................... H04W 4/70 |
| 2019/0222522 A1* | 7/2019 | Shih | .................... H04L 47/2475 |

* cited by examiner

*Primary Examiner* — Quang N Nguyen
(74) *Attorney, Agent, or Firm* — Compass IP Law PC

(57) ABSTRACT

Examples include techniques to establish service level agreements (SLAs or quality of service (QoS) for remote accessible storage devices. Examples include setting up SLA/QoS for an end-to-end path between a client computing node hosting an application and one or more remotely accessible storage devices coupled with a target host computing node. The client computing node and the target host computing node coupled through a networking fabric.

29 Claims, 15 Drawing Sheets

SLA/QoS Client Mapping Table 401

| GlobalPASID | SLA Value | QoS |
|---|---|---|
| 108-610-1 | 20 GB/s | CloS – 7 |
| 108-611-1 | 10 GB/s | CloS – 5 |
| 110-620-1 | 35 GB/s | CloS – 10 |
| 112-630-1 | 25 GB/s | CloS – 8 |
| 112-631-1 | 8 GB/s | CloS – 4 |
| 112-631-2 | 15 GB/s | CloS – 6 |

*FIG. 6*

Format 800

| GlobalPASID 810 | SLA Metric 820 | QoS Metric 830 | Access Type 840 |

RECEIVE, AT A PROCESSOR CIRCUIT FOR A CLIENT COMPUTING NODE, A SLA OR QoS REQUEST FROM AN APPLICATION HOSTED BY THE CLIENT COMPUTING NODE, THE SLA OR QoS REQUEST INDICATING AN SLA VALUE OR QoS TO REMOTELY ACCESS ONE OR MORE STORAGE DEVICES COUPLED WITH A TARGET HOST COMPUTING NODE, THE CLIENT COMPUTING NODE COUPLED WITH THE HOST TARGET NODE THROUGH A NETWORKING FABRIC
*1102*

ASSIGN AN IDENTIFIER TO THE APPLICATION RESPONSIVE TO A DETERMINATION THAT AT LEAST THE CLIENT COMPUTING NODE HAS AVAILABLE RESOURCES TO SUPPORT THE INDICATED SLA VALUE OR QoS
*1104*

SEND THE SLA OR QoS REQUEST TO THE TARGET HOST COMPUTING NODE IN A FIRST FABRIC PACKET
*1106*

RECEIVE AN ACK MESSAGE IN A SECOND FABRIC PACKET ROUTED FROM THE TARGET HOST COMPUTING NODE THROUGH THE NETWORKING FABRIC, THE ACK MESSAGE INCLUDING THE IDENTIFIER AND AN INDICATION THAT THE SLA OR QoS REQUEST HAS BEEN GRANTED
*1108*

RECEIVE, AT A CONTROLLER, A SLA OR QoS REQUEST TO ACCESS AT LEAST ONE STORAGE DEVICE OF A PLURALITY OF STORAGE DEVICES COUPLED WITH A TARGET HOST COMPUTING NODE, THE SLA OR QoS REQUEST INCLUDED IN A FIRST FABRIC PACKET ROUTED FROM A CLIENT COMPUTING NODE THROUGH A NETWORKING FABRIC COUPLED WITH THE TARGET HOST COMPUTING NODE, THE SLA OR QoS REQUEST ORIGINATING FROM AN APPLICATION HOSTED BY THE CLIENT COMPUTING NODE AND HAVING AN IDENTIFIER, THE SLA OR QoS REQUEST INDICATING AN SLA VALUE OR QoS TO ACCESS THE AT LEAST ONE STORAGE DEVICE
1202

DETERMINE THAT THE AT LEAST ONE STORAGE DEVICE HAS AVAILABLE RESOURCES TO SUPPORT THE INDICATED SLA VALUE OR QoS
1204

CAUSE AN ACK MESSAGE TO BE SENT TO THE CLIENT COMPUTING NODE IN A SECOND FABRIC PACKET THAT IS ROUTED THROUGH THE NETWORKING FABRIC, THE ACK MESSAGE INCLUDING THE IDENTIFIER AND AN INDICATION THAT THE SLA OR QoS REQUEST HAS BEEN GRANTED
1206

*FIG. 12*

TECHNIQUES TO ESTABLISH SERVICE LEVEL AGREEMENTS OR QUALITY OF SERVICE FOR REMOTELY ACCESSIBLE STORAGE DEVICES

TECHNICAL FIELD

Examples described herein are generally related to managing storage devices remotely accessible to computing nodes coupled to the storage devices via a networking fabric.

BACKGROUND

Demands by individuals, researchers, and enterprises for increased compute performance and storage capacity of computing devices have resulted in various computing technologies developed to address those demands. For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of computing nodes connected via high-speed interconnects (e.g., fabric interconnects in a unified fabric).

A sharper focus on resource provisioning, resource management and meeting quality of service (QoS) requirements associated with service level agreements (SLAs) for large-scale computing environments may lead to a closer look at how certain resources are used. An area of focus may be use of disaggregated memory or storage devices that may be remotely accessed by computing nodes. These disaggregated memory or storage devices may include non-volatile and/or volatile types of memory that may be accessed through a memory controller. In some examples, the memory controller and the disaggregated memory or storage devices may be arranged to operate according to one or more standards or specifications such as, but not limited to, the Non-Volatile Memory Express (NVMe) Base Specification, revision 1.3, published in May 2017 ("NVM Express base specification" or "NVMe base specification"). For these examples, memory or storage devices capable of being accessed using NVMe base specification protocols may be referred to as "NVMe devices".

NVMe devices may be remotely accessed by computing nodes interconnected via one or more types of unified fabric that may be referred to as "networking fabrics" that may use one or more communication protocols to exchange information or data. These networking fabrics may be capable of using a common architecture that supports use of NVMe base specification storage protocols to remotely access NVMe devices. Example communication protocols used by these networking fabrics may include, but are not limited to, Fibre Channel, InfiniBand, Remote Direct Memory Access (RDMA) over Converged Ethernet (RoCE), Internet Wide Area RDMA Protocol (iWARP) or transmission control protocol (TCP) communication protocols. The common architecture used by these types of networking fabrics may be based on one or more standards or specifications such as, but not limited to, the NVM Express over Fabrics (NVMeoF) Specification, revision 1.0, published in June 2016 ("NVMeoF specification"). Memory controllers hosted by computing nodes coupled with networking fabrics arranged to operate according to the NVMeoF specification to allow for remote access to NVMe devices may be referred to as "NVMeoF controllers".

BRIEF DESCRIPTION OF THE DRAWINGS

FIG. 6 illustrates an example table.
FIG. 8 illustrates an example format.
FIG. 11 illustrates an example of a first logic flow.
FIG. 12 illustrates an example of a second logic flow.

DETAILED DESCRIPTION

In some examples, an area of focus for large-scale computing environments may be how disaggregated memory or storage devices may be managed most effectively. These disaggregated memory or storage devices may include NVMe devices that may be remotely accessible through an NVMeoF controller hosted by a computing node coupled with multiple other computing nodes via a networking fabric using a common architecture defined by the NVMeoF specification. In current implementations involving a common networking fabric architecture based, at least in part, on the NVMeoF specification, read/write requests from computing nodes may be generated to remotely access NVMe devices through an NVMeoF controller. The source or requester generating these read/write requests may be referred to as "client computing nodes" or "requesting computing nodes".

According to some example implementations involving a common networking fabric based, at least in part, on the NVMeoF specification, client computing nodes may have computing workloads that may cause remote access to NVMe devices. These computing workloads may cause the remote access to occur with different or varying performance requirements. Also, in a multi-tenant environment, client computing nodes may host multiple applications that may share NVMe devices as well as other types of resources. The other types of resources may include resources at client computing nodes as well as networking fabric resources such as switches, network interface cards (NICs) or host fabric interfaces (HFIs). Tenants may have varying SLA or QoS requirements.

In some examples, service providers (e.g., internet service providers (ISPs) may implement SLA/QoS solutions that may keep resources such as NVMe devices underutilized to be sure SLAs or QoS requirements can be guaranteed for tenants when needed. For example, allocate 40% of NVMe devices and leave the remaining 60% of NVMe device unallocated. Thereby, peak demand between different applications associated with possibly different tenants that are hosted by client computing nodes may be absorbed by none-allocated/underutilized NVMe devices to guarantee SLAs or QoS requirements can be met. These types of SLA/QoS solutions may unacceptably increases a total cost of ownership (TCO) and reduces system flexibility by leaving a large amount of resources underutilized for extended periods of time.

Figure 1:
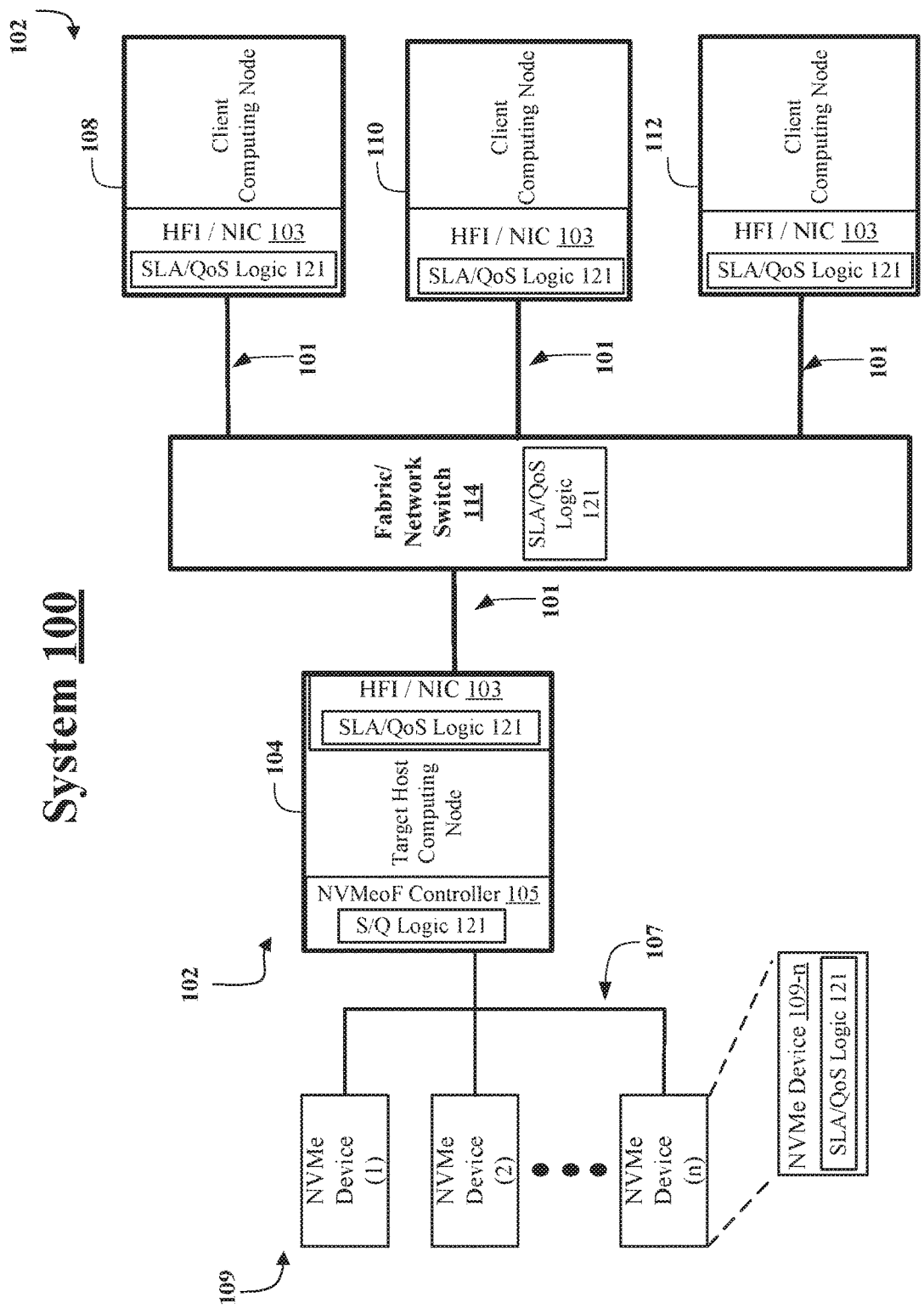
FIG. 1 illustrates an example system.

FIG. 1 illustrates an example system 100. In some examples, system 100 may represent at least a portion of a data center, a high performance computing (HPC) network, a telecommunications core network, an enterprise network or cloud-based distributed network. As shown in FIG. 1, computing nodes 102 may include a target host computing node 104 as well as multiple client computing nodes 108, 110 and 112. Computing nodes 102 may separately be communicatively coupled to a fabric/network switch 114 via individual fabric links 101. It should be appreciated that fabric/network switch 114 may be capable of receiving and forwarding network traffic (e.g., fabric packets, messages, datagrams, etc.) from computing nodes 102 coupled via fabric links 101. As described more below, each computing node 102 may include a host fabric interface (HFI)/network interface card (NIC) 103. HFI/NIC 103 may include communication circuitry and/or communication logic to enable computing nodes 102 to communicatively couple via fabric links 101 routed through fabric/network switch 114 and to facilitate receiving or transmitting of network traffic routed through fabric/network switch 114 and over fabric links 101.

In some examples, as shown in FIG. 1, target host computing node 104 may include an NVMeoF controller 105. As described more below, NVMeoF controller 105 may include logic and/or features capable of facilitating read/write access to selected NVMe devices from among NVMe devices 109. NVMe devices 109 are shown in FIG. 1 as NVMe device (1) through NVMe device (n) that may be coupled via links 107. For these examples, the "nth" NVMe device of NVMe devices 109 may represent a positive integer and designates one or more additional NVMe devices 109. Also, links 107 may be configured to operate according to the NVMe base specification to access NVMe devices 109.

According to some examples, NVMe devices 109 may serve as disaggregated storage resources that may be remotely accessible to client computing nodes 108, 110 or 112. For these examples, this remote access may be facilitated by NVMeoF controller 105 that is configured to operate according to the NVMeoF specification. Also, fabric links 101, fabric/network switch 114 and HFI/NIC 103 included in computing nodes 102 may be configured to operate using various types of communication protocols including, but not limited to, Fibre Channel, InfiniBand, RoCE, iWARP or TCP communication protocols as well as operating according to the NVMeoF specification to remotely access NVMe devices 109 via fabric links 101.

In some examples, NVMeoF controller 105 may receive access requests to read data from or write data to NVMe devices 109. These access requests may have originated from client computing nodes 108, 110 or 112 and may have been routed to target host computing node 104 via fabric links 101 through fabric/network switch 114. As described more below, SLA/QoS logic 121 may be located at multiple levels of system 100 in order to establish an end-to-end path from client computing nodes 108, 110 or 112 to NVMe devices 109 for setting up SLAs and/or QoS requirements responsive to SLA or QoS requests. The SLA or QoS requests may originate from or be initiated by applications hosted at client computing nodes. As shown in FIG. 1, SLA/QoS logic 121 may be located with HFI/NIC 103 at each computing node 102, with fabric/network switch 114, with NVMeoF controller 105 and at each NVMe device 109.

According to some examples, NVMe devices 109 may include storage devices such as solid state drives (SSDs) or other types of storage devices that may include non-volatile and/or volatile types of memory. Volatile types of memory may be memory whose state (and therefore the data stored on it) is indeterminate if power is interrupted. Non-volatile types of memory may refer to memory whose state is determinate even if power is interrupted. Dynamic volatile memory requires refreshing the data stored in this type of memory to maintain state. One example of dynamic volatile memory includes DRAM, or some variant such as synchronous DRAM (SDRAM). In addition to, or alternatively to, volatile types of memory included in NVMe device 109, non-volatile types of memory may be included in NVMe device(s) 109. According to some examples, non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), anti-ferroelectric memory, resistive memory including the metal oxide base, the oxygen vacancy base and the conductive bridge Random Access Memory (CB-RAM), a spintronic magnetic junction memory, a magnetic tunneling junction (MTJ) memory, a Domain Wall (DW) and Spin Orbit Transfer (SOT) memory, a thiristor based memory, a magnetoresistive random access memory (MRAM) that incorporates memristor technology, spin transfer torque MRAM (STT-MRAM), or a combination of any of the above.

In some examples, computing nodes 102 may be embodied as any type of compute device that is capable of performing the functions described herein, such as, without limitation, a server (e.g., stand-alone, rack-mounted, blade, etc.), a network appliance (e.g., physical or virtual), a web appliance, a distributed computing system, and/or a multi-processor-based system.

It should be appreciated that, in other examples, there may be any number of computing nodes 102 (e.g., other target host computing nodes 104, other client computing nodes 108, 110, 112, etc.) coupled to fabric/network switch 114 or another fabric switch similar to fabric/network switch 114 in system 100. Accordingly, there may be multiple fabric switches in other examples. It should be further appreciated that, in such examples, multiple fabric switches may be connected, or daisy chained, to each other.

Figure 2:
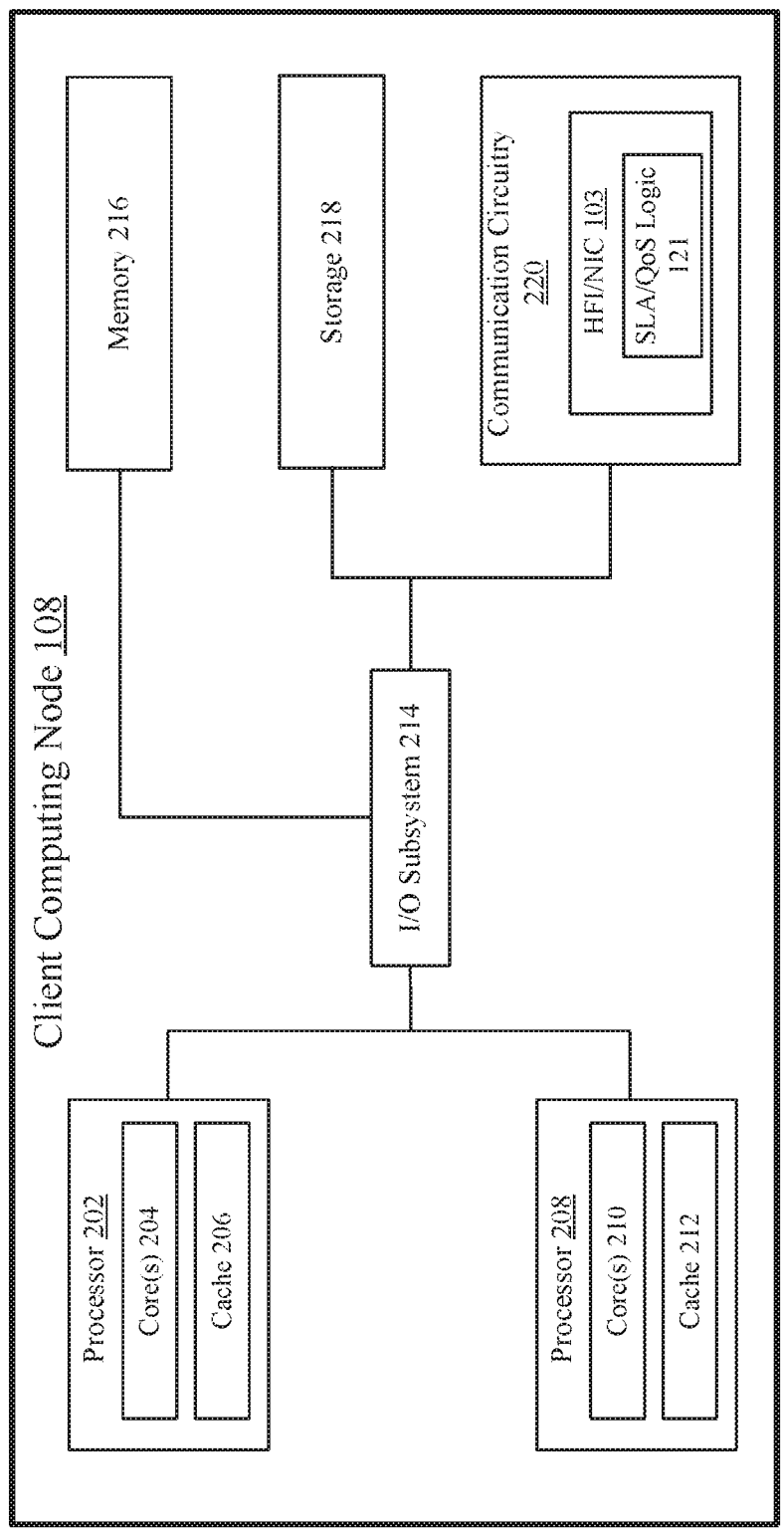
FIG. 2 illustrates an example client computing node.

FIG. 2 illustrates an example block diagram of client computing node 108. Client computing nodes 110 and 112 may have a similar example block diagrams. In some examples, as shown in FIG. 2, client computing node 108 includes a first processor, designated as processor 202, a second processor, designated as processor 208, an input/output (I/O) subsystem 214, memory 216, storage 218, and communication circuitry 220. Client computing node 108 may include other or additional components, such as those commonly found in a computing device (e.g., peripheral devices, other processing/storage hardware, etc.), in other embodiments. Additionally, in some examples, one or more of the components shown in FIG. 2 may be incorporated in, or otherwise form a portion of, another component. For example, cache memory of client computing node 108 (e.g., cache memory 206, 212), or portions thereof, may be incorporated in one or both of the processors 202, 208. Further, in some examples, one or more of the illustrative components may be omitted from the client computing node 108. For example, although client computing node 108 is shown as including two processors 202, 208, the client computing node 108 may include a greater number of processors in other embodiments.

According to some examples, each of the processors 202, 208 (i.e., physical processor packages) may be embodied as any type of multi-core processor capable of performing the functions described herein, such as, but not limited to, a single physical multi-processor core chip, or package. For example, processor 202 includes one or more processor core(s) 204, while processor 208 may similarly include one or more processor cores 210.

In some examples, processor core(s) 204, 210 may be separately embodied as an independent logical execution unit capable of executing programmed instructions. Processor core(s) 204, 210 may include a portion of cache memory (e.g., an L1 cache) and functional units usable to independently execute programs or threads. It should be appreciated that, in some examples of client computing node 108 (e.g., supercomputers), client computing node 108 may include thousands of processor cores. Each of the processors 202, 208 may be connected to a physical connector, or socket, on a motherboard (not shown) of the client computing node 108 that is configured to accept a single physical processor package (i.e., a multi-core physical integrated circuit).

According to some examples, as shown in FIG. 2, processor 202 may additionally include a cache memory 206 and processor 208 may include a cache memory 212. Each cache memory 206, 212 may be embodied as any type of cache that respective processor 202, 208 may access more quickly than memory 216, such as an on-die or on-processor cache. In other examples, cache memory 206, 212 may be an off-die cache, but may reside on a same system-on-a-chip (SoC) as respective processor 202, 208. It should be appreciated that, in some examples, cache memory 206, 212 may have a multi-level architecture. In other words, in such multi-level architecture examples, cache memory 206, 212 may be embodied as one or more of an L1, L2, or L3 cache.

In some examples, memory 216 may be embodied as any type of volatile or non-volatile memory or data storage device capable of performing the functions described herein. In operation, memory 216 may store various data and software used during operation of the client computing node 108, such as operating systems, applications, programs, libraries, and drivers. Memory 216 may be communicatively coupled to processors 202, 208 via I/O subsystem 214, which may be embodied as circuitry and/or components to facilitate input/output operations with processors 202, 208, memory 216, and other components of client computing node 108. For example, I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some examples, I/O subsystem 214 may form a portion of a SoC and may be incorporated, along with one or both of processors 202, 208, memory 216, and/or other components of client computing node 108, on a single integrated circuit chip.

According to some examples, storage 218 may be composed of any type of storage device or devices configured for short-term or long-term storage of data such as, for example, memory devices and circuits, memory cards, hard disk drives, solid-state drives, or other types of storage devices. It should be appreciated that storage 218 and/or the memory 216 (e.g., the computer-readable storage media) may store various data as described herein, including operating systems, applications, programs, libraries, drivers, instructions, etc., capable of being executed by a processor (e.g., processor 202, processor 208, etc.) of client computing node 108.

In some examples, communication circuitry 220 may include any communication circuit, device, or collection thereof, capable of enabling wireless and/or wired communications between client computing node 108 and other computing devices (e.g., another client computing node 108, network switch 114, etc.). Communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to affect such communication. The communication technologies may also include those associated with networking fabrics and may include communications protocols such as, but not limited to, Fibre Channel communication protocols, InfiniBand communication protocols, RoCE communication protocols, iWARP communication protocols or TCP communication protocols.

According to some examples, as shown in FIG. 2, communication circuitry 220 may include a HFI/NIC 103. HFI/NIC 103 may be composed of one or more add-in-boards, daughter cards, controller chips, chipsets, or other devices that may be used by client computing node 108. For example, HFI/NIC 103 may be integrated with one or both of processors 202, 208 (e.g., on a coherent fabric within one or both of processors 202, 208), embodied as an expansion card coupled to I/O subsystem 214 over an expansion bus (e.g., PCI Express (PCIe)), part of a SoC that includes one or more processors, or included on a multichip package that also contains one or more processors. Additionally or alternatively, in some examples, functionality of HFI/NIC 103 may be integrated into one or more components of client computing node 108 at the board level, socket level, chip level, and/or other levels. HFI/NIC 103 may be configured to facilitate transfer of data/messages to enable tasks executing on processors 202, 208 to access shared structures (e.g., shared physical memory) of other computing nodes 102, such as may be necessary during parallel or distributed computing operations as described herein.

In some examples, as briefly mentioned above for FIG. 1, and as shown in FIG. 2, SLA/QoS logic 121 may be located with HFI/NIC 103. For these examples, SLA/QoS logic 121 at HFI/NIC 103 may process SLA or QoS requests received from applications and may also assist in the setting up of SLA or QoS requirements. Processing of the SLA or QoS requests may include verifying that client computing resources are available to support the SLA or QoS request for submitting access requests to NVMe devices from among NVMe devices 109. For example, adequate computing and/or networking resources at client computing node 108 to support the requested SLA or QoS requirements.

According to some examples, SLA/QoS logic 121 located at a client computing node's HFI/NIC 103 may include logic and/or features to assign an identifier to applications hosted by the client computing node that may place SLA or QoS requests. In some examples, the assigned identifier may be a global process address space identifier (GlobalPASID). Also, in some examples, a given application having an assigned GlobalPASID may have different access streams that may be identified in the assigned GlobalPASID. A respectively assigned GlobalPASID an identified stream (if applicable) may follow SLA or QoS requests initiated by applications as the SLA or QoS requests are processed at multiple levels of an end-to-end path from client computing nodes 108 to one or more NVMe devices among NVMe devices 109 in order to set up or not set up respective SLAs and/or QoS requirements for these applications and/or access streams of these applications.

In some examples, SLA/QoS logic 121 may be embodied in a field programmable gate array (FPGA) included with HFI/NIC 103 at a client computing node. For these examples, logic and/or features of SLA/QoS logic 121 may be executed by the FPGA. The FPGA may be occasionally reprogrammed to enable SLA/QoS logic 121 to adapt to changing SLA or QoS requirements or to other changes that may impact how SLA or QoS requests are processed.

Figure 3:
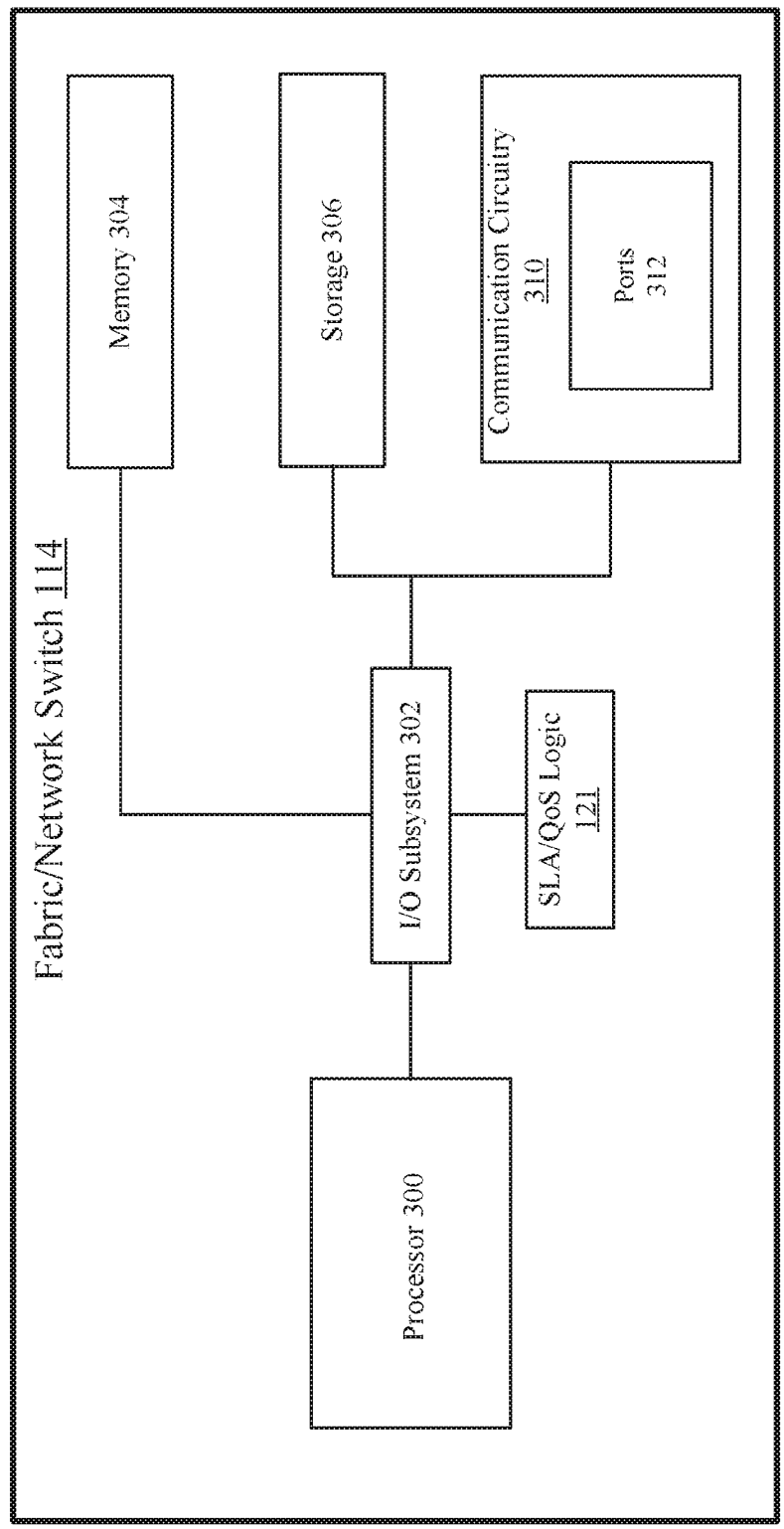
FIG. 3 illustrates an example fabric/network switch.

FIG. 3 illustrates an example block diagram of fabric/network switch 114. In some examples, as shown in FIG. 3, similar to client computing node 108 shown in FIG. 2, fabric/network switch 114 includes a processor 300, an I/O subsystem 302, a memory 304, a data storage device 306, communication circuitry 310. As such, further descriptions of the like components are not repeated herein with the understanding that the description of the corresponding components provided above in regard to client computing node 108 shown in FIG. 2 applies equally to the corresponding components of fabric/network switch 114 shown in FIG. 3. Fabric/network switch 114 may include other or additional components, such as those commonly found in a network traffic or a fabric switching device (e.g., peripheral devices, other processing/storage hardware, etc.), in other examples. Additionally, in some examples, one or more of the illustrative components may be incorporated in, or otherwise form a portion of, another component. Further, in some embodiments, one or more of the illustrative components may be omitted from the fabric/network switch 114.

In some examples, as shown in FIG. 3, communication circuitry 310 may include multiple switch ports 312 (i.e., input/output ports) for transmitting and receiving data to/from fabric/network switch 114. Accordingly, in some examples, fabric/network switch 114 may be configured to create a separate collision domain for each of switch ports 312. As such, depending on the network design of fabric/network switch 114 and the operation mode (e.g., half-duplex, full-duplex, etc.), it should be appreciated that each of computing nodes 102 connected to one of the switch ports 312 of fabric/network switch 114 may be configured to transfer data to any of other computing nodes 102 at any given time, and the transmissions should not interfere, or collide. Communication circuitry 310 may be configured to use one or more communication technologies associated with networking fabrics including, but not limited to, Fibre Channel, InfiniBand, RoCE, iWARP or TCP communication protocols.

In some examples, as briefly mentioned above for FIG. 1, and as shown in FIG. 3, SLA/QoS logic 121 may be located with fabric/network switch 114. For these examples, SLA/QoS logic 121 at fabric/network switch 114 may assist in the setting up of SLA or QoS requirements. SLA/QoS logic 121 located at fabric/network switch 114 may include logic and/or features to process SLA or QoS requests sent from client computing nodes and then forward the SLA or QoS requests towards target host computing nodes. Processing of the SLA or QoS requests may include verifying that fabric/network switch resources are available to support the SLA or QoS request. For example, adequate available network bandwidth and or ports from among Ports 312 to meet indicated SLA needs or QoS requirements. If so, the logic and/or features of SLA/QoS logic 121 located at fabric/network switch 114 may cause the SLA or QoS requests to be forwarded towards respective target host computing nodes for further set up of the SLA or QoS requests.

In some examples, SLA/QoS logic 121 may be embodied in a FPGA located at fabric/network switch 114. For these examples, logic and/or features of SLA/QoS logic 121 may be executed by this fabric/network switch 114 located FPGA. The FPGA may be occasionally reprogrammed to enable SLA/QoS logic 121 to adapt to changing SLA or QoS requirements or to other changes that may impact how SLA or QoS requests are processed at fabric/network switch 114.

Figure 4:
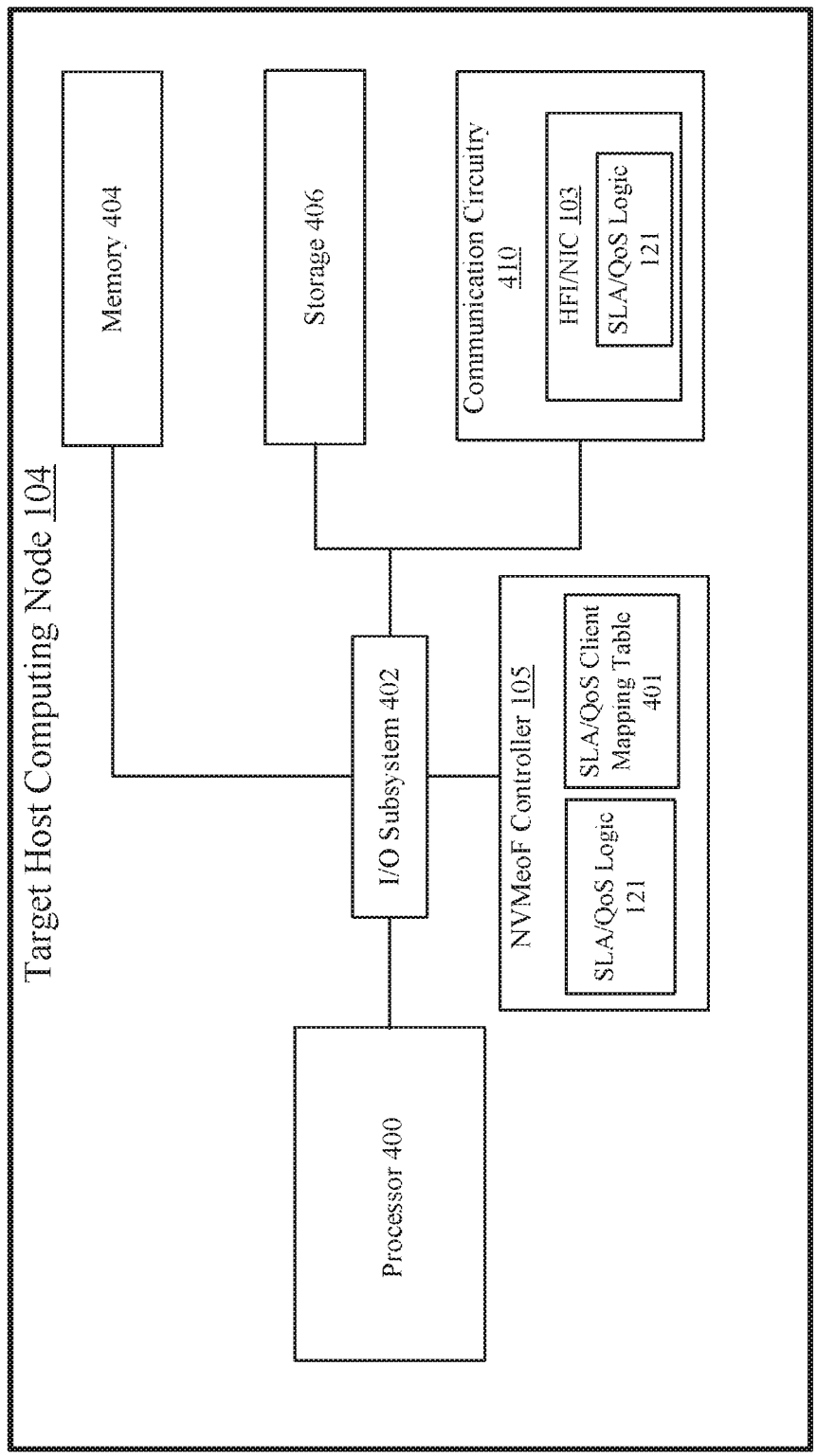
FIG. 4 illustrates an example target host computing node.

FIG. 4 illustrates an example block diagram of target host computing node 104. In some examples, as shown in FIG. 4, target host computing node 104 includes a processor 400, an I/O subsystem 402, memory 404, storage 406, communication circuitry 410 and NVMeoF controller 105. Of course, it should be appreciated that one or more of the computing nodes 102 may include other or additional components, such as those commonly found in a computing device (e.g., peripheral devices, other processing/storage hardware, etc.), in other examples. Additionally, in some examples, one or more of the components shown in FIG. 4 may be incorporated in, or otherwise form a portion of, another component. For example, portions of memory 404 of target host computing node 104 may be incorporated in processor 400 (e.g., as cache memory) or incorporated in NVMeoF controller 105. Further, in some examples, one or more of the illustrative components may be omitted from the target host computing node 104 or added to target host computing node 104. For example, although target host computing node 104 is shown as including a single processor 400, the target host computing node 104 may include a greater number of processors in other examples.

According to some examples, processor 400 may be embodied as any type of multi-core processor capable of performing the functions described herein, such as, but not limited to, a single physical multi-processor core chip, or package. In some examples, processor core(s) of processor 400 may be separately embodied as an independent logical execution unit capable of executing programmed instructions. These processing core(s) may include a portion of cache memory (e.g., an L1 cache) and functional units usable to independently execute programs or threads. In some examples, processor 400 may be connected to a physical connector, or socket, on a motherboard (not shown) of the target host computing node 104 that is configured to accept a single physical processor package (i.e., a multi-core physical integrated circuit).

In some examples, memory 404 may be embodied as any type of volatile or non-volatile memory or data storage device capable of performing the functions described herein. In operation, memory 404 may store various data and software used during operation of the target host computing node 104, such as operating systems, applications, programs, libraries, and drivers. Memory 404 may be communicatively coupled to processor 400 or NVMeoF controller 105 via I/O subsystem 402, which may be embodied as circuitry and/or components to facilitate input/output operations with processor 400, NVMeoF controller 105, memory 404, or other components of target host computing node 104. For example, I/O subsystem 402 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some examples, I/O subsystem 402 may form a portion of a SoC and may be incorporated, along with one or all of processor 400, memory 404, NVMeoF controller 105 and/or other components of target host computing node 104, on a single integrated circuit chip.

According to some examples, storage 406 may be composed of any type of storage device or devices configured for short-term or long-term storage of data such as, for example, memory devices and circuits, memory cards, hard disk drives, solid-state drives, or other types of storage devices. It should be appreciated that storage 406 and/or the memory 404 (e.g., the computer-readable storage media) may store various data as described herein, including operating systems, applications, programs, libraries, drivers, instructions, etc., capable of being executed by a processor (e.g., processor 400) of target host computing node 104.

In some examples, communication circuitry 410 may include any communication circuit, device, or collection thereof, capable of enabling wireless and/or wired communications between target host computing node 104 and other computing devices (e.g., a client computing node 104, fabric/network switch 114, etc.). Communication circuitry 410 may be configured to use one or more communication technologies associated with networking fabrics including, but not limited to, Fibre Channel, InfiniBand, RoCE, iWARP or TCP communication protocols. Communication circuitry 410 may also capable of using other types of communication technologies in addition to those associated with networking fabric communication protocols to enable wireless and/or wired communications between target host computing node 104 and other computing devices (e.g., Internet Protocol (IP), Ethernet, Bluetooth®, Wi-Fi®, WiMAX, LTE, 5G, etc.).

According to some examples, as shown in FIG. 4, communication circuitry 410 may include HFI/NIC 103. Similar to what was mentioned above for FIG. 2, HFI/NIC 103 may be composed of one or more add-in-boards, daughter cards, NICs, controller chips, chipsets, or other devices that may be used by target host computing node 104. Also, similar to what was mentioned above for FIG. 2, functionality of HFI/NIC 103 may be integrated into one or more components of target host computing node 104 at the board level, socket level, chip level, and/or other levels. HFI/NIC 103 at target host computing node 104 may include logic and/or features to facilitate exchanges of data/messages between components (e.g., NVMeoF controller 105) of target host computing node 104 and client computing nodes received or transmitted over fabric links of a networking fabric in order for the client computing nodes to remotely access one or more NVMe devices coupled with target host computing node 104. For example, facilitating the exchange of data/messages received in one or more fabric packets from client computing nodes 108, 110 or 112 routed via fabric links 101 through fabric/network switch 114 to target host computing node 104 coupled with NVMe devices 109 as shown in FIG. 1 for system 100. The one or more fabric packets may be arranged or exchanged according to communication protocols including, but not limited to, Fibre Channel, InfiniBand, RoCE, iWARP or TCP communication protocols and/or according to the NVMeoF specification.

In some examples, as briefly mentioned above for FIG. 1, and as shown in FIG. 4, SLA/QoS logic 121 may be located with HFI/NIC 103 at target host computing node 104. For these examples, SLA/QoS logic 121 at HFI/NIC 103 may assist in the setting up of SLA or QoS requirements at target host computing node 104. A SLA/QoS logic 121 located at a target host computing node's HFI/NIC 103 may include logic and/or features to process SLA or QoS requests sent from client computing nodes. Processing of the SLA or QoS requests may include verifying that target host computing resources are available to support the SLA or QoS request. For example, adequate computing resources and/or network I/O resources to meet indicated SLA needs or QoS requirements. If so, the logic and/or features of SLA/QoS logic 121 located at target host computing node 104 may cause the SLA or QoS requests to be forwarded to NVMeoF controller 105 for further set up of the SLA or QoS requests.

In some examples, as shown in FIG. 4 and also shown in FIG. 1, target host computing node 104 also includes NVMeoF controller 105. As mentioned briefly above for FIG. 1, NVMeoF controller 105 may include logic and/or features to receive access requests to read data from or write data to NVMe devices 109. Also, as briefly mentioned for FIG. 1 and as shown in FIG. 4, NVMeoF may include SLA/QoS logic 121 to assist in setting up SLA or QoS requests received from client computing nodes. As described more below, SLA/QoS logic 121 located with NVMeoF controller 105 may utilize SLA/QoS client mapping table 401 to process a received SLA or QoS request to determine whether NVMe device resources may be available to meet requested SLA or QoS requirements.

In some examples, SLA/QoS logic 121 at HFI/NIC 103 of target host computing node 104 or at NVMeoF controller 105 may be embodied in an FPGA. For either of these examples, logic and/or features of SLA/QoS logic 121 may be executed by the FPGA. The FPGA may be occasionally reprogrammed to enable SLA/QoS logic 121 to adapt to changing SLA or QoS requirements or to other changes that may impact how SLA or QoS requests are processed at HFI/NIC 103 or NVMeoF controller 105.

Figure 5:
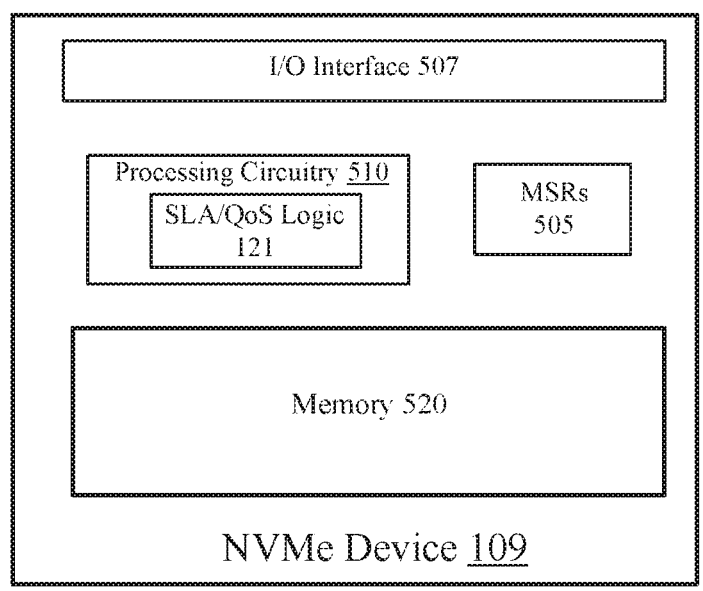
FIG. 5 illustrates an example NVMe device.

FIG. 5 illustrates an example NVMe device 109. In some examples, as shown in FIG. 5, NVMe device 109 includes machine state registers (MSRs) 505, I/O interface 507, processing circuitry 510 and memory 520. For these examples, I/O interface 507 may enable NVMe device 109 to receive and/or fulfill read/write access requests to memory 520 via links such as links 107 coupled with target host computing node 104 as shown in FIG. 1. I/O interface 507 may be configured to operate according to the NVMe base specification to facilitate fulfilling read/write access requests and to communicate with NVMeoF controller 105 at target host computing device 104.

In some examples, MSRs 505 may include configurable registers that may store configuration values for resource allocations to meet SLA or QoS requirements. For these examples, MSRs 505 may be pre-configured (e.g., at time manufacture of NVMe device 109) to set how a first percentage of memory 520 may be allocated to guarantee SLAs, a second percentage of memory 520 may be allocated to guarantee QoS requirements and the remaining percentage may be used for best effort (e.g., not allocated to guaranteeing SLA or QoS requirements). In some examples, MSRs 505 may reconfigured responsive to commands received from NVMeoF controller 105 to adapt to changing needs for resources allocations to either guarantee SLAs or QoS requirements.

According to some examples, processing circuitry 510 may include on board or on device processing circuitry to process read/write access requests to memory 520 and to receive/respond to commands sent from NVMeoF controller 105. For these examples, processing circuitry 510 may include or execute logic and/or features to support SLA/QoS logic 121 at NVMe device 109. As briefly mentioned for FIG. 1, NVMe device 109 may include SLA/QoS logic 121 to assist in setting up SLA or QoS requests received from applications hosted by client computing nodes. In some examples, SLA/QoS logic 121 may utilize MSRs 505 to determine whether adequate memory 520 resources are available to meet respective SLA or QoS requests. SLA/QoS logic 121 may indicate to NVMeoF controller 105 whether adequate resources are available as part of setting up an end-to-end path from client computing nodes 108, 110 or 112 to NVMe devices 109 for SLA and/or QoS requirements. The SLA or QoS requirements may be setup responsive to SLA or QoS requests originating from applications hosted by client computing nodes.

In some examples, SLA/QoS logic 121 at NVMe device 109 may be embodied in an FPGA. For these examples, logic and/or features of SLA/QoS logic 121 may be executed by the FPGA. The FPGA may be occasionally reprogrammed to enable SLA/QoS logic 121 to adapt to changing SLA or QoS requirements or to other changes that may impact how SLA or QoS requests are processed at NVMe device 109.

According to some examples, NVMe device 109 may not include SLA/QoS logic 121. Rather, SLA/QoS logic 121 at NVMeoF controller 105 may send a command that reads MSRs 505 to determine whether adequate memory 520 resources are available to meet respective SLA or QoS requests. For example, if MSRs 505 indicates a 40% allocation to support SLAs and 40% allocation to support QoS and a given SLA or QoS request would result in either of these percentages being exceeded, the given SLA or QoS request may be denied.

According to some examples, as mention above for FIG. 1, NVMe device 109 may include volatile or non-volatile types of memory. For these examples, memory 520 may include the same types of volatile or non-volatile as mentioned above for FIG. 1.

FIG. 6 illustrates an example SLA/QoS client mapping table 401. In some examples, as shown in FIG. 6, SLA/QoS client mapping table 401 includes information related to GlobalPASIDs that have been mapped to SLA and QoS requirements that have been set up or granted. For these examples, SLA values may indicate guaranteed memory bandwidth in gigabytes per second (GB/s). QoS may indicate a class of service (CloS) level. A Clos level may indicate a priority of an application in relation to other applications. A higher value for a given CloS may indicate a higher priority in relation to other applications or streams of applications. For example, QoS of CloS-10 may having a higher priority than any CloSs less than 10. In some examples, SLA/QoS client mapping table 401 may be maintained in a data structure (e.g., a lookup table) stored in a memory maintained at NVMeoF controller 105 and accessible to SLA/QoS logic 121 at NVMeoF controller 105.

In some examples, a GlobalPASID for each entry in SLA/QoS client mapping table 401 may indicate unique identifiers for applications at client computing nodes having SLA and QoS requirements that have been set up or granted. For these examples, the first three digits of each GlobalPASID may indicate which client computing node is hosting the application and the next three digits may identify individual applications hosted by client computing nodes. For example, GlobalPASIDs 108-610-1 and 108-611-1 indicate two different applications hosted by client computing node 108 have set up or granted SLA and QoS requirements. As shown in FIG. 6, 108-610-1 may have an SLA value that indicates a guaranteed memory bandwidth of 20 GB/s and a QoS of CloS-7 has been granted. Meanwhile for 108-611-1 an SLA value of 10 GB/s and a QoS of CloS-5 have been granted. The lower comparative CloS-5 for 108-611-1 compared to Clos-7 for 108-610-1 indicates that the application hosted by client computing node 108 having GlobalPASID 108-610-1 has a higher guaranteed QoS than the application having GlobalPASID 108-611-1.

According to some examples, a stream identifier may be included in a GlobalPASID assigned to an application. For example, as shown in FIG. 6, an application at client computing node 112 having an assigned GlobalPASIDs of 112-631-1 and 112-631-2 has two streams with IDs of "1" and "2". These individually identified streams included in the GlobalPASID may allow a finer grain control of SLA or QoS requests made by applications that may place different SLA or QoS requirements on individual streams.

In some examples, other that assigning a relative priority, a given CloS value for a QoS may be associated with threshold access latencies for read or writing data to NVMe devices. A higher a requested CloS value may equate to a lower guaranteed threshold latency. For example, CloS-5 may have a guaranteed threshold access latency of 5 ms while a Close-10 may have a guaranteed threshold access latency of 1 ms.

Figure 7:
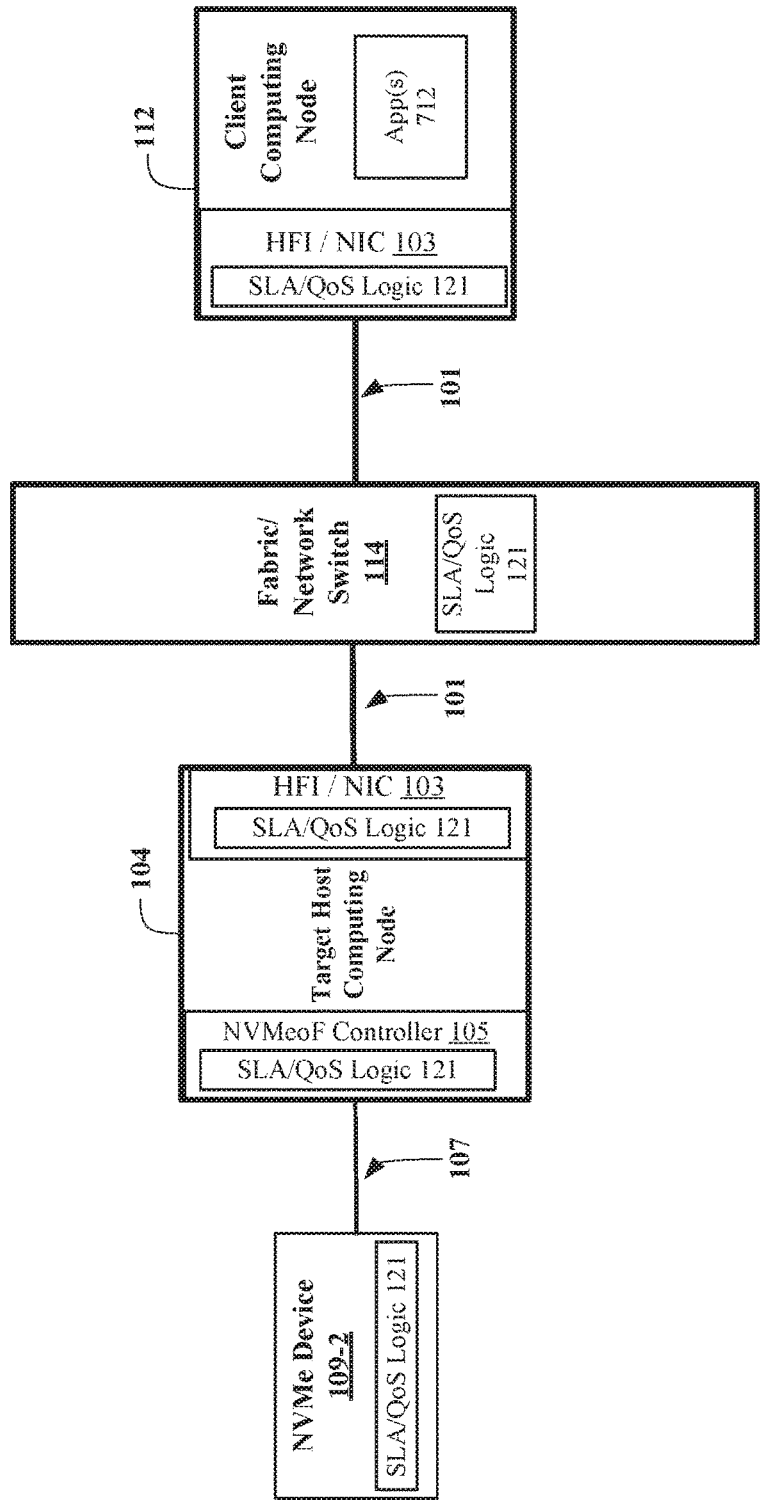
FIG. 7 illustrates an example portion of the system.

FIG. 7 illustrates an example portion 700. In some examples, as shown in FIG. 7, portion 700 includes elements of system 100 shown in FIG. 1 such as client computing node 112, fabric/network switch 114, target host computing node 104 and NVMe devices 109. For these examples, one or more applications (App(s)) 712 hosted by requesting/client computing node 110 may have a need for and/or request SLA or QoS requirements to read from or write to at least one NVMe device of NVMe devices 109. In some examples, SLA/QoS logic 121, as shown in FIG. 7, may be included in multiple levels of portion 700 in order to establish an end-to-end path from client computing node 112 to NVMe devices 109-2 in order to set up SLA and/or QoS requirements responsive to SLA or QoS requests that may originate from App(s) 712. Setting up of requested SLA and/or QoS requirements by elements of portion 700 are described in more details below.

FIG. 8 illustrates an example format 800. In some examples, example format 800 may represent example fields included in SLA or QoS requests. As shown in FIG. 8, example format 800 includes GlobalPASID 810, SLA metric 820, QoS metric 830 and access type 840. For these examples, GlobalPASID 810 may indicate an identifier given to an application initiating or trying setup the SLA or QoS request. SLA metric 820 may indicate a requested guaranteed memory bandwidth (e.g., in GB/s). QoS metric 830 may indicate a requested guaranteed QoS (e.g., a requested CloS). Access type 840 may indicate a direction associated with data traffic. For example, data coming from a client computing node hosting the application making the SLA or QoS request may be written to an NVMe device and may be indicated as a write access type. Data read from an NVMe device and directed to a client computing node hosting the application making the SLA or QoS request may be indicated as a read access type. Data both read from and written to an NVMe device for the application making the SLA or QoS request may be indicated as a read/write access type.

Figure 9:
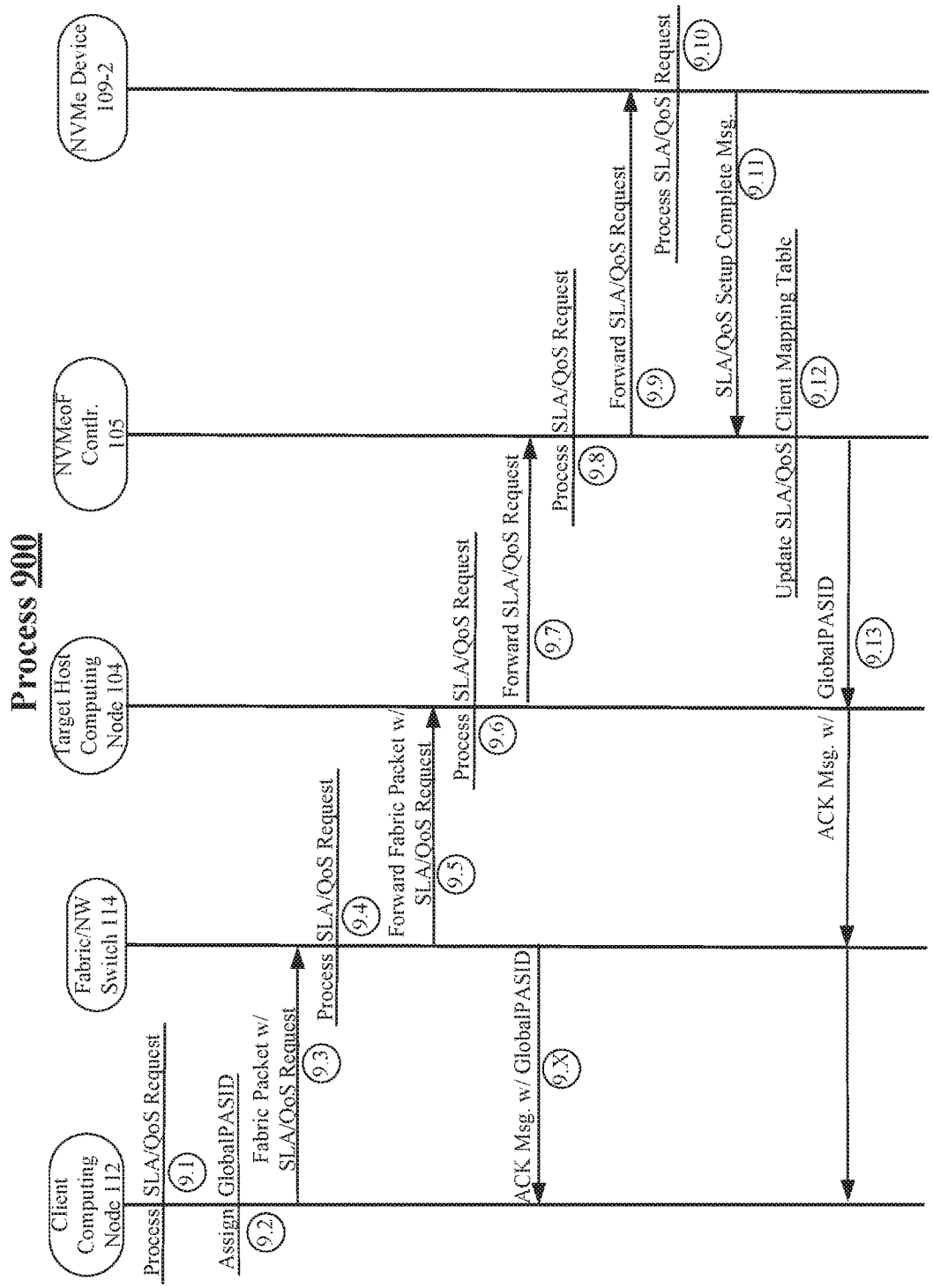
FIG. 9 illustrates an example process.

FIG. 9 illustrates an example process 900. According to some examples, process 900 may be an example of how logic and/or features of SLA/QoS logic 121 at multiple levels of a network fabric may establish an end-to-end path from client computing nodes to storage devices for setting up SLAs and/or QoS requirements responsive to SLA or QoS requests that may originate from applications hosted by the client computing nodes. For these examples, elements of system 100 as shown in FIGS. 1-5 or FIG. 7 may implement at least portions of process 900. Also, SLA/QoS client mapping table 401 as shown in FIG. 6 or example format 800 as shown in FIG. 8 may be used to implement at least portions of process 900. Examples are not limited to elements of system 100 implementing process 900, use of SLA/QoS client mapping table 401 or use of example format 800 when implementing process 900.

Beginning at process 9.1 (Process SLA/QoS Request), SLA/QoS logic 121 at HFI/NIC 103 of client computing node 112 may process an SLA/QoS request received from an application hosted by client computing node 112. In some examples, the application may be from among App(s) 712 and the SLA/QoS request may include an SLA request expressed in a request for a guaranteed memory bandwidth (e.g., 25 GB/s) from one or more NVMe devices from among NVMe devices 109. The SLA/QoS request may also include a QoS request expressed in a desired CloS (e.g., CloS-8). For these examples, HFI/NIC 103 may expose an interface to App(s) 712 (e.g., via a command interface accessible through cores of processors 202 or 208) to place the SLA/QoS request. SLA/QoS logic 121 at HFI/NIC 103 of client computing node 112 may process the SLA/QoS request by determining whether adequate computing and/or networking resources are available to support the requested SLA or QoS requirements. Although not shown in FIG. 9, in some examples, if adequate computing or networking resources are not available, SLA/QoS logic 121 at HFI/NIC 103 of client computing node 112 may cause a negative acknowledgement (NACK) to be sent to the application to indicate that the SLA/QoS request cannot be supported by at least client computing node 112.

Moving to process 9.2 (Assign GlobalPASID), SLA/QoS logic 121 at HFI/NIC 103 of client computing node 112 may assigned a GlobalPASID to the application placing the SLA/QoS request (e.g., 112-630). In some examples, the assignment of the GlobalPASID may be responsive to a determination by SLA/QoS logic 121 that client computing node 112 has adequate available resources to support the SLA/QoS request. According to some examples, the GlobalPASID may also include an identifier of a stream for the application.

Moving to process 9.3 (Fabric Packet(s) w/SLA/QoS Request), requesting/client computing node 108 may generate and send one or more fabric packets that may include the SLA/QoS request. In some examples, as shown in FIG. 9, the fabric packet may be routed to fabric/network switch 114. The one or more fabric packets may be arranged or exchanged according to communication protocols including, but not limited to, Fibre Channel, InfiniBand, RoCE, iWARP or TCP communication protocols and/or according to the NVMeoF specification. Also, information related to the SLA/QoS request may be included as described above for example format 800 in FIG. 8. For example, the SLA/QoS request may include the assigned GlobalPASID, steam ID, an SLA value, a QoS and an access type for read/write accesses associated with the SLA/QoS request.

Moving to process 9.4 (Process SLA/QoS Request), SLA/QoS logic 121 at fabric/network switch 114 may verify that fabric/network switch resources are available to support the SLA/QoS request. For example, adequate available network bandwidth and or ports from among Ports 312 to meet the indicated SLA value or QoS for the indicated access type. Although not shown in FIG. 9, in some examples, if adequate fabric/network switch resources are not available, SLA/QoS logic 121 at fabric/network switch 114 may cause a NACK message to be sent to the client computing node 112 to indicate that the SLA/QoS request cannot be supported by at least fabric/network switch 114.

Moving to process 9.5 (Forward Fabric Packet w/SLA/QoS Request), fabric/network switch 114 may forward the fabric packet w/the SLA/QoS request to target host computing node 104. In some examples, forwarding the fabric packet with the SLA/QoS request may be responsive to a determination by SLA/QoS logic 121 that fabric/network switch 114 has adequate available resources to support the SLA/QoS request.

Moving to process 9.6 (Process SLA/QoS Request), SLA/QoS logic 121 at HFI/NIC 103 of target host computing node 104 may process the SLA/QoS request. In some examples, logic and/or features at target host computing node 104 such as HFI/NIC 103 may first process the fabric packet in order to de-encapsulate the SLA/QoS Request from the fabric packet. SLA/QoS logic 121 may then verify that target host computing resources are available to support the SLA or QoS request. Although not shown in FIG. 9, in some examples, if adequate resources are not available, SLA/QoS logic 121 at HFI/NIC 103 of target host computing node 104 may cause a NACK message to be sent to the client computing node 112 to indicate that the SLA/QoS request cannot be supported by at least target host computing node 104.

Moving to process 9.7 (Forward SLA/QoS Request), SLA/QoS logic 121 at target host computing node 104 may cause the SLA/QoS request to be forwarded to NVMeoF controller 105. According to some examples, forwarding the SLA/QoS request may be responsive to a determination by SLA/QoS logic 121 that target host computing node 104 has adequate available resources to support the SLA/QoS request.

Moving to process 9.8 (Process SLA/QoS request), SLA/QoS logic 121 at NVMeoF controller 105 may process the SLA/QoS request. In some examples, SLA/QoS logic 121 at NVMeoF controller 105 may utilize SLA/QoS client mapping table 401 to process receive SLA or QoS request to determine whether NVMe device resources from among NVMe devices 109 may be available to meet the requested SLA or QoS requirements. For example, SLA/QoS client mapping table 401 may indicate that granted SLA or QoS requests have yet to reach a resource commitment threshold to prevent setting up the requested SLA or QoS requirements indicated in the SLA/QoS request with any NVMe device from among NVMe devices 109. Although not shown in FIG. 9, in some examples, if adequate resources are not available, SLA/QoS logic 121 at NVMeoF controller 105 may cause a NACK message to be sent to the client computing node 112 to indicate that the SLA/QoS request cannot be supported by NVMe devices 109.

Moving to process 9.9 (Forward SLA/QoS Request), SLA/QoS logic 121 at NVMeoF controller 105 may cause the SLA/QoS request to be forwarded to NVMe device 109-2. In some examples, forwarding the SLA/QoS request may be responsive to a determination by SLA/QoS logic 121 that NVMe device 109-2 may have adequate available resources to support the SLA/QoS request.

Moving to process 9.10 (Process SLA/QoS request), SLA/QoS logic 121 at NVMe device 109-2 may process the SLA/QoS request. According to some examples, SLA/QoS logic 121 at NVMe device 109-2 may process the SLA/QoS request by determining whether the SLA value or the QoS indicated would cause NVMe device 190-2 to exceed a percentage of resources indicated in MSRs 505 for guaranteeing SLAs or guaranteeing QoS. Although not shown in FIG. 9, in some examples, if setting up the SLA or QoS causes either to exceed respective percentages for SLA or QoS, SLA/QoS logic 121 at NVMe 109-2 may cause a NACK message to be sent to the client computing node 112 to indicate that the SLA/QoS request cannot be supported by NVMe devices 109-2.

Moving to process 9.11 (SLA/QoS Setup Complete Msg.), SLA/QoS logic 121 at NVMe device 109-2 may cause an SLA/QoS setup complete message to be sent to NVMeoF controller 105. According to some examples, the SLA/QoS set complete message may indicate to NVMeoF controller that NVMe 109-2 is now ready to support the requested SLA or QoS for access request received from the application at client computing node 112.

Moving to process 9.12, (Update SLA/QoS Client Mapping Table), SLA/QoS logic 121 at NVMeoF controller 105 may update SLA/QoS client mapping table 401 to include the GlobalPASID of the application for which the requested SLA or QoS was set up. SLA/QoS client mapping table 401 may also be updated to include SLA values, QoS and access type.

Moving to process 9.13, (ACK Msg. w/GlobalPASID), SLA/QoS logic 121 at NVMeoF controller 105 may cause an acknowledgement (ACK) message that includes the GlobalPASID of the application to be sent to client computing node 112 through fabric/network switch 114. In some examples, responsive to receiving this ACK message, individual SLA/QoS logic 121 along the path between NVMeoF controller 105 and client computing node 112 may update respectively maintained tables to reflect that the application having the assigned GlobalPASID has SLA values and a QoS setup for an end-to-end path from client computing node 112 to NVMe device 190-2. Resources at each point in the path may then be reserved or allocated to support the SLA values and QoS as the application remotely accesses NVMe device 190-2. In some examples, SLA/QoS logic 121 at HFI/NIC 103 of client computing node 112 may indicate to the requesting application that the requested SLA value and/or QoS has been setup for the end-to-end path. Process 900 may then come to an end.

Figure 10:
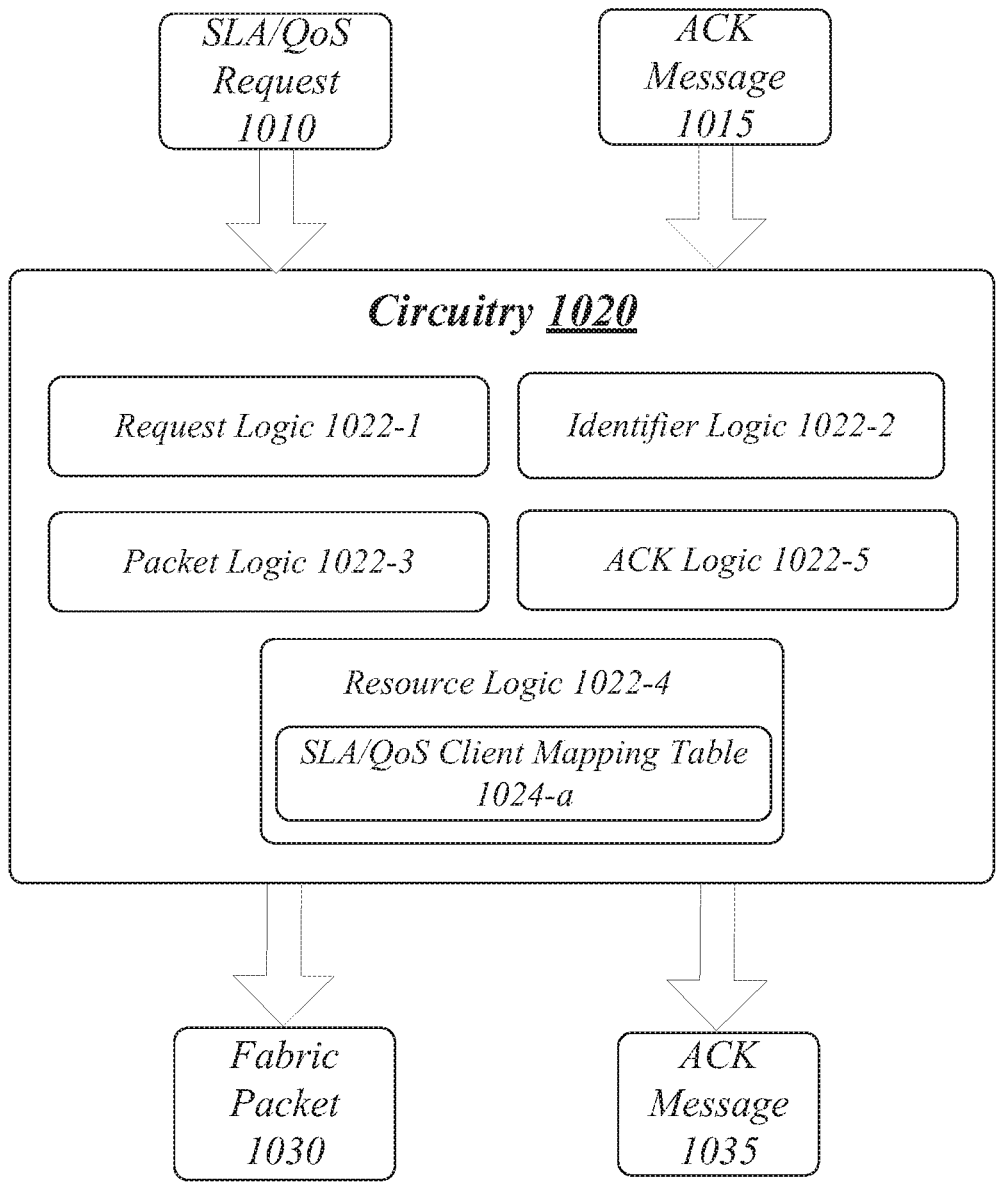
FIG. 10 illustrates an example block diagram for an apparatus.

FIG. 10 illustrates an example block diagram for an apparatus 1000. Although apparatus 1000 shown in FIG. 10 has a limited number of elements in a certain topology, it may be appreciated that the apparatus 1000 may include more or less elements in alternate topologies as desired for a given implementation.

According to some examples, at least some elements of apparatus 1000 may be associated with a controller hosted by a target host computing node coupled with a networking fabric. For example, NVMeoF controller 105 as shown in FIG. 1, 4 or 7. In other examples, apparatus 1000 may be associated with logic and/or features at an HFI/NIC of a client computing node. For example, HFI/NIC 103 as shown in FIG. 1, 2 or 7. Apparatus 1000 may be supported by circuitry 1020. For either of these examples, circuitry 1020 may be incorporated within a processor, central processing unit (CPU), application specific integrated circuit (ASIC) or may include one or more FPGAs. Circuitry 1020 may be arranged to execute one or more software, firmware or hardware implemented modules, components or logic 1022-a (module, component or logic may be used interchangeably in this context). It is worthy to note that "a" and "b" and "c" and similar designators as used herein are intended to be variables representing any positive integer. Thus, for example, if an implementation sets a value for a=5, then a complete set of any combination of software, firmware or hardware for logic 1022-a may include logic 1022-1, 1022-2, 1022-3, 1022-4 or 1022-5. The examples presented are not limited in this context and the different variables used throughout may represent the same or different integer values. Also, "logic", "module" or "component" may also include software/firmware stored in computer-readable media, and although the types of logic are shown in FIG. 10 as discrete boxes, this does not limit these components to storage in distinct computer-readable media components (e.g., a separate memory, etc.).

According to some examples, circuitry 1020 may include a processor, processor circuit or processor circuitry. Circuitry 1020 may be generally arranged to execute or implement one or more modules, components or logic 1022-a. Circuitry 1020 may be all or at least a portion of any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples, circuitry 1020 may also include an ASIC and at least some logic 1022-a may be implemented as hardware elements of the ASIC. According to some examples, circuitry 1020 may also include an FPGA and at least some logic 1022-a may be implemented as hardware elements of the FPGA.

According to some examples, apparatus 1000 may include request logic 1022-1. For examples where apparatus 1000 is associated with an HFI/NIC at a client computing node, request logic 1022-1 may be executed or implemented by circuitry 1020 to receive an SLA or QoS request from an application hosted by the client computing node. For these examples, the SLA or QoS request may indicate an SLA value or QoS to remotely access one or more storage devices coupled with a target host computing node. The client computing node may be coupled with the target host computing node through a networking fabric. For these examples, the SLA or QoS request may be received in SLA/QoS request 1010.

For examples where apparatus 1000 is associated with an NVMeoF controller, request logic 1022-1 may be executed or implemented by circuitry 1020 to receive a SLA or QoS request to access at least one storage device of a plurality of storage devices coupled with a target host computing node hosting the controller. The SLA or QoS request may be included in a first fabric packet routed from a requesting computing node through a networking fabric coupled with the target host computing node. The SLA or QoS request may originate from an application hosted by the client computing node and having an identifier. The SLA or QoS request may indicate an SLA value or QoS to access the at least one storage device. For these examples, the SLA or QoS request may be received in SLA/QoS request 1010.

In some examples, apparatus 1000 may include identifier logic 1022-2. For examples where apparatus 1000 is associated with an HFI/NIC at a client computing node, identifier logic 1022-2 may be executed or implemented by circuitry 1020 to assign an identifier to the application responsive to a determination that at least the client computing node has available resources to support the indicated SLA value or QoS. For these examples, the identifier may include a GlobalPASID. Identifier logic 1022-2 may also include a stream identifier in the GlobalPASID.

According to some examples, apparatus 1000 may include packet logic 1022-3. For examples where apparatus 1000 is associated with an HFI/NIC at a client computing node, packet logic 1022-3 may be executed or implemented by circuitry 1020 to cause the SLA or QoS request to be sent to the target host computing node in a first fabric packet. For these examples, the first fabric packet may be included in fabric packet 1030.

In some examples, apparatus 1000 may include resource logic 1022-4. For examples where apparatus 1000 is associated with an NVMeoF controller, resource logic 1022-4 may be executed or implemented by circuitry 1020 to determine that the at least one storage device has available resources to support the indicated SLA value or QoS. For these examples, resource logic 1022-4 may use or refer to SLA/QoS client mapping table 1024-*a* to determine if available resources to support the indicated SLA value or QoS. Resource logic 1022-4 may also determine if resources are available based on an indication for the at least one storage device that it can support the requested SLA value or QoS (e.g., based on MSRs configured at the at least one storage device).

For examples where apparatus 1000 is associated with an HFI/NIC at a client computing node, resource logic 1022-4 may be executed or implemented by circuitry 1020 to determine if the client computing node has adequate computing and networking resource to supported the indicated SLA value or QoS. For example, adequate computing resources to process fabric packets received or sent when accessing the one or more storage devices as well as adequate networking resources to send and receive the fabric packets via fabric links coupled with the client computing node.

According to some examples, apparatus 1000 may include ACK logic 1022-5. For examples where apparatus 1000 is associated with an HFI/NIC at a client computing node, ACK logic 1022-5 may be executed or implemented by circuitry 1020 to receive an ACK message in a second fabric packet routed from the target host computing node through the networking fabric. For these examples, the ACK message may include the identifier and an indication that the SLA or QoS request has been granted. The ACK message may be included in ACK message 1015.

For examples where apparatus 1000 is associated with an NVMeoF controller, ACK logic 1022-5 may cause an ACK message to be sent to the client computing node in a second fabric packet that is routed through the networking fabric. For these examples, the ACK message may include the identifier and an indication that the SLA or QoS request has been granted. The ACK message may be included in ACK message 1035.

Various components of apparatus 1000 and a server or node implementing apparatus 1000 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 11 illustrates an example of a logic flow 1100. Logic flow 1100 may be representative of some or all of the operations executed by one or more logic, features, or devices described herein, such as apparatus 1000. For examples where apparatus 1000 is associated with an HFI/NIC at a client computing node, logic flow 1100 may be implemented by at least request logic 1022-1, identifier logic 1022-2, packet logic 1022-3 or ACK logic 1022-5.

According to some examples, logic flow 1100 at block 1102 may receive, at a processor circuit for a client computing node, a SLA or QoS request from an application hosted by the client computing node, the SLA or QoS request indicating an SLA value or QoS to remotely access one or more storage devices coupled with a target host computing node, the client computing node coupled with the target host computing node through a networking fabric. For these examples, request logic 1022-1 may receive the SLA or QoS request.

In some examples, logic flow 1100 at block 1104 may assign an identifier to the application responsive to a determination that at least the client computing node has available resources to support the indicated SLA value or QoS. For these examples, identifier logic 1022-2 may assign the identifier.

According to some examples, logic flow 1100 at block 1106 may send the SLA or QoS request to the target host computing node in a first fabric packet. For these examples, packet logic 1022-3 may cause the first fabric packet to be sent.

In some examples, logic flow 1100 at block 1108 may receive an ACK message in a second fabric packet routed from the target host computing node through the networking fabric, the ACK message including the identifier and an indication that the SLA or QoS request has been granted. For these examples, ACK logic 1022-5 may receive the ACK message. In some examples, ACK logic 1022-5 may forward the ACK message to the requesting application to indicate that the requested SLA value and/or QoS included in the SLA or QoS request has been setup for remote access to the one or more storage devices.

FIG. 12 illustrates an example of a logic flow 1200. Logic flow 1200 may be representative of some or all of the operations executed by one or more logic, features, or devices described herein, such as apparatus 1000. For examples where apparatus 1000 is associated with an NVMeoF controller, logic flow 1200 may be implemented by at least request logic 1022-1, resource logic 1022-4 or ACK logic 1022-5.

According to some examples, logic flow 1200 at block 1202 may receive, at a controller, a SLA or QoS request to access at least one storage device of a plurality of storage devices coupled with a target host computing node, the SLA or QoS request included in a first fabric packet routed from a client computing node through a networking fabric coupled with the target host computing node, the SLA or QoS request originating from an application hosted by the client computing node and having an identifier, the SLA or QoS request indicating an SLA value or QoS to access the at least one storage device. For these examples, request logic 1022-1 may receive the SLA or QoS request.

In some examples, logic flow 1200 at block 1204 may determine that the at least one storage device has available resources to support the indicated SLA value or QoS. For these examples, resource logic 1022-4 may determine that the at least one storage device has available resources.

According to some examples, logic flow 1200 at block 1206 may cause an ACK message to be sent to the client computing node in a second fabric packet that is routed through the networking fabric, the ACK message including the identifier and an indication that the SLA or QoS request has been granted. For these examples, ACK logic 1022-5 may cause the ACK message to be sent.

Figure 13:
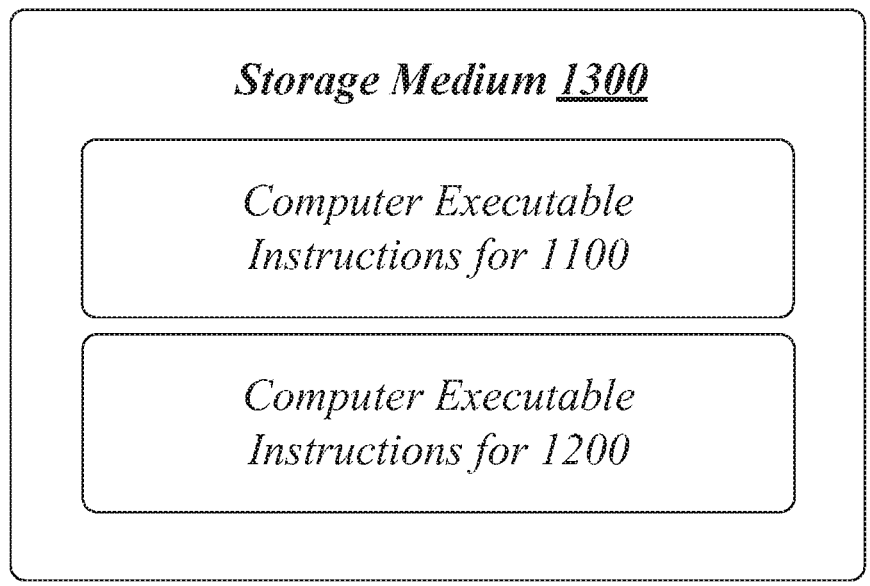
FIG. 13 illustrates an example of a storage medium.

FIG. 13 illustrates an example of a storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 1100 or logic flow 1200. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
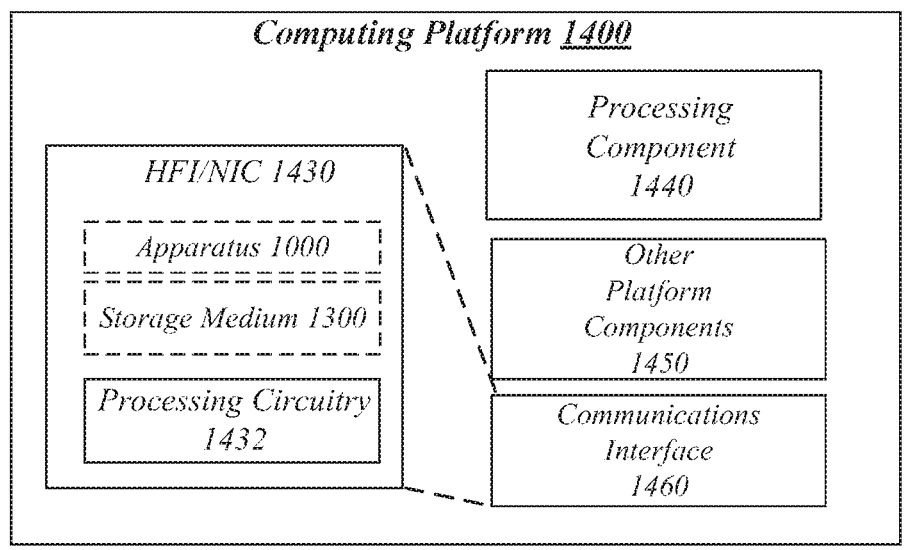
FIG. 14 illustrates an example first computing platform.

FIG. 14 illustrates an example computing platform 1400. In some examples, as shown in FIG. 14, computing platform 1400 may include a HFI/NIC 1430, a processing component 1440, other platform components 1450 or a communications interface 1460. According to some examples, computing platform 1400 may be implemented in a target host computing node coupled to a networking fabric such as target host computing node 104 shown in FIG. 1 or 4.

According to some examples, as shown in FIG. 14, HFI/NIC 1430 may be part of communication interface 1460. HFI/NIC 1430 may be implemented in a similar manner to HFI/NIC 103 of system 100 as shown in FIGS. 1-2. For these examples, logic and/or features resident at or located at HFI/NIC 1430 may execute at least some processing operations or logic for apparatus 1000 and may include storage media that includes storage medium 1300. HFI/NIC 1430 may include processing circuitry 1432. Processing circuitry may include various hardware elements. Examples of hardware elements may include devices, logic devices, components, processors, microprocessors, circuits, processor circuits, circuit elements (e.g., transistors, resistors, capacitors, inductors, and so forth), integrated circuits, ASICs, programmable logic devices (PLDs), digital signal processors (DSP), FPGAs, memory units, logic gates, registers, semiconductor device, chips, microchips, chip sets, and so forth.

According to some examples, processing component 1440 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, ASICs, PLDs, DSPs, FPGAs/programmable logic, memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1450 may include memory units, chipsets, controllers, peripherals, interfaces, oscillators, timing devices, video cards, audio cards, multimedia I/O components (e.g., digital displays), power supplies, and so forth. Examples of memory units associated with either other platform components 1450 or storage system 1430 may include without limitation, various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, ferroelectric memory, SONOS memory, polymer memory such as ferroelectric polymer memory, FeTRAM or FeRAM, ovonic memory, single or multi-level PCM, nanowire, memristers, STT-MRAM, magnetic or optical cards, an array of devices such as Redundant Array of Independent Disks (RAID) drives, solid state memory devices, solid state drives (SSDs), hard disk drives (HDDs) or any other type of storage media suitable for storing information.

In some examples, communications interface 1460 may include logic and/or features to support a communication interface that may include, but is not limited to HFI/NIC 1430. For these examples, communications interface 1460 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe base specification, the SATA specification, SAS specification or the USB specification. Network communications may occur through a network interface via use of communication protocols or standards such as those described in one or more Ethernet standards promulgated by the IEEE. For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communication may also occur over fabric links coupled with computing platform 1400 according to the NVMeoF specification, or using one or more of or using one or more of Fibre Channel communication protocols, InfiniBand communication protocols, RoCE communication protocols, iWARP communication protocols or TCP communication protocols.

As mentioned above computing platform 1400 may be implemented in a client computing node coupled to a networking fabric. Accordingly, functions and/or specific configurations of computing platform 1400 described herein, may be included or omitted in various embodiments of computing platform 1400, as suitably desired for a computing node coupled to a networking fabric.

Figure 15:
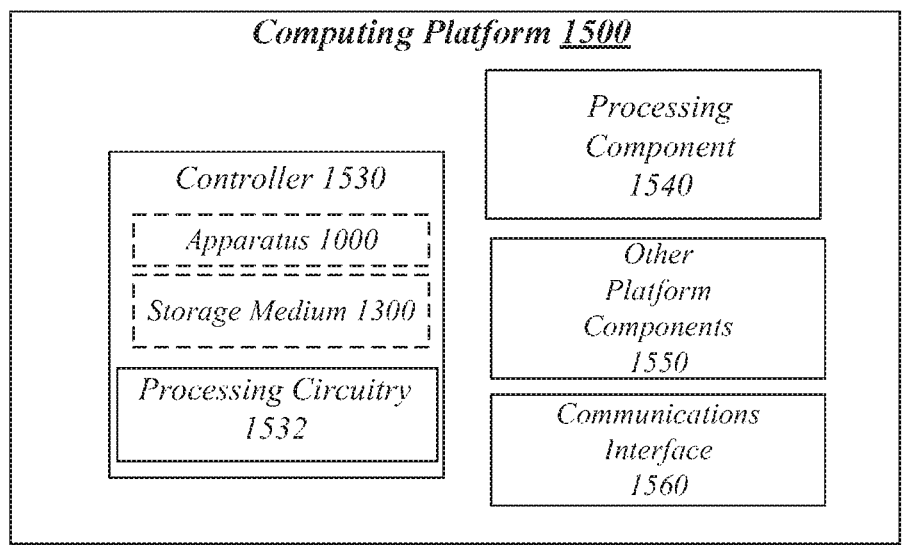
FIG. 15 illustrates an example second computing platform.

FIG. 15 illustrates an example computing platform 1500. In some examples, as shown in FIG. 15, computing platform 1500 may include a controller 1530, a processing component 1540, other platform components 1550 or a communications interface 1560. According to some examples, computing platform 1500 may be implemented in a target host computing node coupled to a networking fabric such as target host computing node 104 shown in FIG. 1 or 4.

According to some examples, controller 1530 may be similar to NVMeoF controller 105 of system 100 as shown in FIG. 1 or 4. For these examples, logic and/or features resident at or located at controller 1530 may execute at least some processing operations or logic for apparatus 800 and may include storage media that includes storage medium 1000. Controller 1530 may include processing circuitry 1532. Processing circuitry may include various hardware elements such as those mentioned above for computing platform 1400. Examples of hardware elements may include devices, logic devices, components, processors, microprocessors, circuits, processor circuits, circuit elements, integrated circuits, ASICs, PLDs, DSPs, FPGAs, memory units, logic gates, registers, semiconductor device, chips, microchips, chip sets, and so forth.

According to some examples, processing component 1540 may include various hardware elements, software elements, or a combination of both. Examples of hardware elements may be similar to those mentioned above for processing component 1440 of computing platform 1400. Examples of software elements may also be similar to those mentioned above for processing component 1440 of computing platform 1400.

In some examples, other platform components 1550 may include memory units, chipsets, controllers, peripherals, interfaces, oscillators, timing devices, video cards, audio cards, multimedia I/O components (e.g., digital displays), power supplies, and so forth. Examples of memory units associated with either other platform components 1550 or storage system 1500 may include without limitation, various types of computer readable and machine readable storage media in the form of one or more higher speed memory units, such as those mentioned above for computing platform 1400.

In some examples, communications interface 1560 may include logic and/or features to support a communication interface. For these examples, communications interface 1560 may include one or more communication interfaces that operate according to various communication protocols or standards to communicate over direct or network communication links. Direct communications may occur through a direct interface via use of communication protocols or standards described in one or more industry standards (including progenies and variants) such as those associated with the SMBus specification, the PCIe specification, the NVMe base specification, the SATA specification, SAS specification or the USB specification. Network communications may occur through a network interface via use of communication protocols or standards such as those described in one or more Ethernet standards promulgated by the IEEE. For example, IEEE 802.3. Network communication may also occur according to one or more OpenFlow specifications such as the OpenFlow Hardware Abstraction API Specification. Network communication may also occur over fabric links coupled with computing platform 1500 according to the NVMeoF specification, or using one or more of Fibre Channel communication protocols, InfiniBand communication protocols, RoCE communication protocols, iWARP communication protocols or TCP communication protocols.

As mentioned above computing platform 1500 may be implemented in a target host computing node coupled to a networking fabric. Accordingly, functions and/or specific configurations of computing platform 1500 described herein, may be included or omitted in various embodiments of computing platform 1500, as suitably desired for a computing node coupled to a networking fabric.

The components and features of computing platform 1400 or computing platform 1500 may be implemented using any combination of discrete circuitry, ASICs, logic gates and/or single chip architectures. Further, the features of computing platform 1400 or computing platform 1500 may be implemented using microcontrollers, programmable logic arrays and/or microprocessors or any combination of the foregoing where suitably appropriate. It is noted that hardware, firmware and/or software elements may be collectively or individually referred to herein as "logic", "circuit" or "circuitry."

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry for a client computing node and logic for execution by the circuitry. The logic may receive an SLA or QoS request from an application hosted by the client computing node. The SLA or QoS request may indicate an SLA value or QoS to remotely access one or more storage devices coupled with a target host computing node. The client computing node may be coupled with the target host computing node through a networking fabric. The logic may also assign an identifier to the application. The logic may also cause the SLA or QoS request to be sent to the target host computing node in a fabric packet. The logic may also receive an ACK message that includes the identifier and an indication that the SLA or QoS request has been granted.

Example 2

The apparatus of example 1, the SLA value indicated in the SLA or QoS request may include a guaranteed memory bandwidth to access the one or more storage devices.

Example 3

The apparatus of example 1, the QoS indicated in the SLA or QoS request may include a class of service that indicates a priority of access to the one or more storage devices as compared to other accesses granted to other applications to access the one or more storage devices.

Example 4

The apparatus of example 1, the logic may also assign the identifier to the application responsive to a determination that at least the client computing node has available resources to support the indicated SLA value or QoS. The available resources may include adequate computing and networking resources to support the indicated SLA value or QoS.

Example 5

The apparatus of example 1, the identifier may include a GlobalPASID.

Example 6

The apparatus of example 5, the GlobalPASID may also include a stream identifier to identify an access stream from among a plurality of access streams for the application.

Example 7

The apparatus of example 1, the SLA or QoS request may also indicate a type of access, the type of access including one of a read access type, a write access type or a read/write access type.

Example 8

The apparatus of example 1, the circuitry may include an FPGA.

Example 9

The apparatus of example 1, the plurality of storage devices may be arranged to operate according to one or more NVMe Base Specifications including the NVMe Base Specification, revision 1.3.

Example 10

The apparatus of example 9, the fabric packet including the SLA or QoS request may be arranged according to the one or more NVMeoF Specifications including the NVMeoF Specification, revision 1.0.

Example 11

The apparatus of example 10, comprising the networking fabric arranged to operate using Fibre Channel communication protocols, InfiniBand communication protocols, RoCE communication protocols, iWARP communication protocols or TCP communication protocols.

Example 12

An example method may include receiving, at a processor circuit for a client computing node, an SLA or QoS request from an application hosted by the client computing node. The SLA or QoS request may indicate an SLA value or QoS to remotely access one or more storage devices coupled with a target host computing node. The client computing node may be coupled with the target host computing node through a networking fabric. The method may also include assigning an identifier to the application. The method may also include sending the SLA or QoS request to the target host computing node in a fabric packet. The method may also include receiving an ACK message that includes the identifier and an indication that the SLA or QoS request has been granted.

Example 13

The method of example 12, the SLA value indicated in the SLA or QoS request may include a guaranteed memory bandwidth to access the one or more storage devices.

Example 14

The method of example 12, the QoS indicated in the SLA or QoS request may include a class of service that indicates a priority of access to the one or more storage devices as compared to other accesses granted to other applications to access the one or more storage devices.

Example 15

The method of example 12 may also include assigning the identifier to the application responsive to a determination that at least the client computing node has available resources to support the indicated SLA value or QoS. The available resources may include adequate computing and networking resources to support the indicated SLA value or QoS.

Example 16

The method of example 14, the identifier may include a GlobalPASID.

Example 17

The method of example 16, the GlobalPASID may also include a stream identifier to identify an access stream from among a plurality of access streams for the application.

Example 18

The method of example 12, the SLA or QoS request may also indicate a type of access, the type of access including one of a read access type, a write access type or a read/write access type.

Example 19

The method of example 12, the plurality of storage devices may be arranged to operate according to one or more NVMe Base Specifications including the NVMe Base Specification, revision 1.3.

Example 20

The method of claim 19, the fabric packet including the SLA or QoS request may be arranged according to the one or more NVMeoF Specifications including the NVMeoF Specification, revision 1.0.

Example 21

The method of example 20, the networking fabric may be arranged to operate using Fibre Channel communication protocols, InfiniBand communication protocols, RoCE communication protocols, iWARP communication protocols or TCP communication protocols.

Example 22

An example at least one machine readable medium may include a plurality of instructions that in response to being executed by a system may cause the system to carry out a method according to any one of examples 12 to 21.

Example 23

An apparatus may include means for performing the methods of any one of examples 12 to 21.

Example 24

At least one machine readable medium may include a plurality of instructions that in response to being executed by a system at a client computing node may cause the system to receive an SLA or QoS request from an application hosted by the client computing node, the SLA or QoS request indicating an SLA value or QoS to remotely access one or more storage devices coupled with a target host computing node. The client computing node may be coupled with the target host computing node through a networking fabric. The instructions may also cause the system to assign an identifier to the application. The instructions may also cause the system to send the SLA or QoS request to the target host computing node in a fabric packet. The instructions may also cause the system to receive an ACK message that includes the identifier and an indication that the SLA or QoS request has been granted.

Example 25

The at least one machine readable medium of example 24, the SLA value indicated in the SLA or QoS request comprises a guaranteed memory bandwidth to access the one or more storage devices.

Example 26

The at least one machine readable medium of example 24, the QoS indicated in the SLA or QoS request may include a class of service that indicates a priority of access to the one or more storage devices as compared to other accesses granted to other applications to access the one or more storage devices.

Example 27

The at least one machine readable medium of example 24, the instructions may further cause the system to assign the identifier to the application responsive to a determination that at least the client computing node has available resources to support the indicated SLA value or QoS. The available resources may include adequate computing and networking resources to support the indicated SLA value or QoS.

Example 28

The at least one machine readable medium of example 24, the identifier may include a GlobalPASID.

Example 29

The at least one machine readable medium of example 29, the GlobalPASID may also include a stream identifier to identify an access stream from among a plurality of access streams for the application.

Example 30

The at least one machine readable medium of example 24, the SLA or QoS request may also indicate a type of access, the type of access including one of a read access type, a write access type or a read/write access type.

Example 31

The at least one machine readable medium of example 24, the plurality of storage devices may be arranged to operate according to one or more NVMe Base Specifications including the NVMe Base Specification, revision 1.3.

Example 32

The at least one machine readable medium of example 32, the fabric packet including the SLA or QoS request may be arranged according to the one or more NVMeoF Specifications including the NVMeoF Specification, revision 1.0.

Example 33

The at least one machine readable medium of example 32, the networking fabric may be arranged to operate using Fibre Channel communication protocols, InfiniBand communication protocols, RoCE communication protocols, iWARP communication protocols or TCP communication protocols.

Example 34

An example controller may include circuitry and logic for execution by the circuitry. The logic may receive an SLA or QoS request to access at least one storage device of a plurality of storage devices coupled with a target host computing node hosting the controller, the SLA or QoS request included in a first fabric packet routed from a client computing node through a networking fabric coupled with the target host computing node. The SLA or QoS request may originate from an application hosted by the client computing node and may have an identifier, the SLA or QoS request indicating an SLA value or QoS to access the at least one storage device. The logic may also determine that the at least one storage device has available resources to support the indicated SLA value or QoS. The logic may also cause an ACK message to be sent to the client computing node in a second fabric packet that is routed through the networking fabric, the ACK message including the identifier and an indication that the SLA or QoS request has been granted.

Example 35

The controller of example 34, the SLA value indicated in the SLA or QoS request may include a guaranteed memory bandwidth to access the at least one storage device.

Example 36

The controller of example 34, the QoS indicated in the SLA or QoS request may include a class of service that indicates a priority of access to the at least one storage device as compared to other accesses granted to other applications to access the at least one storage device.

Example 37

The controller of example 36, the logic to determine that the at least one storage device has available resources to support the indicated SLA value or QoS may further include the logic to forward the SLA or QoS request to the at least one storage device and receive an indication from the at least one storage device of available resources to support the indicated SLA value or QoS.

Example 38

The controller of example 34, the logic to determine that the at least one storage device has available resources to support the indicated SLA value or QoS may include the logic to read one or more MSRs maintained at the at least one storage device to determine a first percentage of the at least one storage device available to support SLAs and determine a second percentage available to support QoS. The logic may also determine the at least one storage device has available resources to support the indicated SLA value or QoS based on the SLA value not causing the first percentage to be exceeded or the QoS not causing the second percentage to be exceeded.

Example 40

The controller of example 34, the identifier comprising a GlobalPASID.

Example 41

The controller of example 34, the GlobalPASID may also include a stream identifier to identify an access stream from among a plurality of access streams for the application

Example 42

The controller of example 34, the SLA or QoS request may also indicate a type of access, the type of access including one of a read access type, a write access type or a read/write access type.

Example 42

The controller of example 34, the plurality of storage devices may be arranged to operate according to one or more NVMe Base Specifications including the NVMe Base Specification, revision 1.3.

Example 43

The controller of claim 42, may include the controller arranged to operate according to the NVMe Base Specification, revision 1.3 and according to one or more NVMeoF Specifications including the NVMeoF Specification, revision 1.0.

Example 44

The controller of example 43, the first fabric packet including the SLA or QoS request and the second fabric packet including the ACK message may be arranged according to the one or more NVMeoF Specifications including the NVMeoF Specification, revision 1.0.

Example 45

The controller of example 44, the networking fabric may be arranged to operate using Fibre Channel communication protocols, InfiniBand communication protocols, RoCE communication protocols, iWARP communication protocols or TCP communication protocols.

Example 46

The controller of example 35 may also include one or more of a command bus coupled to the circuitry, one or more processors coupled to the command bus, and a host fabric interface communicatively coupled to the circuitry.

Example 47

An example method may include receiving, at a controller, an SLA or QoS request to access at least one storage device of a plurality of storage devices coupled with a target host computing node. The SLA or QoS request may be included in a first fabric packet routed from a client computing node through a networking fabric coupled with the target host computing node, the SLA or QoS request originating from an application hosted by the client computing node and having an identifier. The SLA or QoS request may indicate an SLA value or QoS to access the at least one storage device. The method may also include determining that the at least one storage device has available resources to support the indicated SLA value or QoS. The method may also include causing an ACK message to be sent to the client computing node in a second fabric packet that is routed through the networking fabric, the ACK message including the identifier and an indication that the SLA or QoS request has been granted.

Example 48

The method of example 47, the SLA value indicated in the SLA or QoS request may include a guaranteed memory bandwidth to access the at least one storage device.

Example 49

The method of example 47, the QoS indicated in the SLA or QoS request may include a class of service that indicates a priority of access to the at least one storage device as compared to other accesses granted to other applications to access the at least one storage device.

Example 50

The method of example 47, determining that the at least one storage device has available resources to support the indicated SLA value or QoS may include forwarding the SLA or QoS request to the at least one storage device. The method may also include receiving an indication from the at least one storage device of available resources to support the indicated SLA value or QoS.

Example 51

The method of example 47, determining that the at least one storage device has available resources to support the indicated SLA value or QoS may also include reading one or more MSRs maintained at the at least one storage device to determine a first percentage of the at least one storage device available to support SLAs and determine a second percentage available to support QoS. The method may also include determining the at least one storage device has available resources to support the indicated SLA value or QoS based on the SLA value not causing the first percentage to be exceeded or the QoS not causing the second percentage to be exceeded.

Example 52

The method of example 47, the identifier may include a GlobalPASID.

Example 53

The method of example 52, the GlobalPASID may also include a stream identifier to identify an access stream from among a plurality of access streams for the application.

Example 54

The method of example 47, the SLA or QoS request may also indicate a type of access, the type of access including one of a read access type, a write access type or a read/write access type.

Example 55

The method of example 47, the plurality of storage devices may be arranged to operate according to one or more NVMe Base Specifications including the NVMe Base Specification, revision 1.3.

Example 56

The method of claim 55, the controller may be arranged to operate according to the NVMe Base Specification, revision 1.3 and according to one or more NVMeoF Specifications including the NVMeoF Specification, revision 1.0.

Example 57

The method of example 56, the SLA or QoS requests included in the first fabric packet may be arranged according to the one or more NVMeoF Specifications include the NVMeoF Specification, revision 1.0.

Example 58

The method of example 57, the networking fabric may be arranged to operate using Fibre Channel communication protocols, InfiniBand communication protocols, RoCE communication protocols, iWARP communication protocols or TCP communication protocols.

Example 59

An example at least one machine readable medium may include a plurality of instructions that in response to being executed by a system may cause the system to carry out a method according to any one of examples 47 to 58.

Example 60

An apparatus may include means for performing the methods of any one of examples 47 to 58.

Example 61

An example at least one machine readable medium may include a plurality of instructions that in response to being executed by a controller may cause the controller to receive an SLA or QoS request to access at least one storage device of a plurality of storage devices coupled with a target host computing node. the SLA or QoS request may be included in a first fabric packet routed from a client computing node through a networking fabric coupled with the target host computing node. The SLA or QoS request may originate from an application hosted by the client computing node and having an identifier, the SLA or QoS request indicating an SLA value or QoS to access the at least one storage device. The instructions may also cause the controller to determine that the at least one storage device has available resources to support the indicated SLA value or QoS. The instructions may also cause the controller to cause an ACK message to be sent to the client computing node in a second fabric packet that is routed through the networking fabric, the ACK message including the identifier and an indication that the SLA or QoS request has been granted.

Example 62

The at least one machine readable medium of example 61, the SLA value indicated in the SLA or QoS request may include a guaranteed memory bandwidth to access the at least one storage device.

Example 63

The at least one machine readable medium of example 61, the QoS indicated in the SLA or QoS request may include a class of service that indicates a priority of access to the at least one storage device as compared to other accesses granted to other applications to access the at least one storage device.

Example 64

The at least one machine readable medium of example 61, the instructions to cause the controller to determine that the at least one storage device has available resources to support the indicated SLA value or QoS may include the instructions to cause the controller to forward the SLA or QoS request to the at least one storage device. The instructions may also cause the controller to receive an indication from the at least one storage device of available resources to support the indicated SLA value or QoS.

Example 65

The at least one machine readable medium of example 61, the instructions to cause the controller to determine that the at least one storage device has available resources to support the indicated SLA value or QoS may include the instructions to cause the controller to read one or more MSRs maintained at the at least one storage device to determine a first percentage of the at least one storage device available to support SLAs and determine a second percentage available to support QoS. The instructions may also cause the controller to determine the at least one storage device has available resources to support the indicated SLA value or QoS based on the SLA value not causing the first percentage to be exceeded or the QoS not causing the second percentage to be exceeded.

Example 66

The at least one machine readable medium of example 61, the identifier may include a GlobalPASID.

Example 67

The at least one machine readable medium of example 66, the GlobalPASID may also include a stream identifier to identify an access stream from among a plurality of access streams for the application.

Example 68

The at least one machine readable medium of example 61, the SLA or QoS request may also indicate a type of access, the type of access including one of a read access type, a write access type or a read/write access type.

Example 69

The at least one machine readable medium of example 61, the plurality of memory devices may be arranged to operate according to one or more NVMe Base Specifications including the NVMe Base Specification, revision 1.3.

Example 70

The at least one machine readable medium of example 69, the controller may be arranged to operate according to the NVMe Base Specification, revision 1.3 and according to one or more NVMeoF Specifications including the NVMeoF Specification, revision 1.0.

Example 71

The at least one machine readable medium of example 72, the first fabric packet including the SLA or QoS request and the second fabric packet including the ACK message may be arranged according to the one or more NVMeoF Specifications including the NVMeoF Specification, revision 1.0.

Example 72

The at least one machine readable medium of example 72, the networking fabric may be arranged to operate using Fibre Channel communication protocols, InfiniBand communication protocols, RoCE communication protocols, iWARP communication protocols or TCP communication protocols.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry for a client computing node; and
   logic for execution by the circuitry to:
      receive a service level agreement (SLA) or quality of service (QoS) request from an application hosted by the client computing node, the SLA or QoS request indicating an SLA value or QoS to remotely access one or more storage devices coupled with a target host computing node, the client computing node coupled with the target host computing node through a networking fabric;
      assign an identifier to the application;
      cause the SLA or QoS request to be sent to the target host computing node in a fabric packet; and
      receive an acknowledgment (ACK) message that includes the identifier and an indication that the SLA or QoS request has been granted.

2. The apparatus of claim 1, the SLA value indicated in the SLA or QoS request comprises a guaranteed memory bandwidth to access the one or more storage devices.

3. The apparatus of claim 1, the QoS indicated in the SLA or QoS request comprises a class of service that indicates a priority of access to the one or more storage devices as compared to other accesses granted to other applications to access the one or more storage devices.

4. The apparatus of claim 1, comprising the logic to:
   assign the identifier to the application responsive to a determination that at least the client computing node has available resources to support the indicated SLA value or QoS, the available resources to include adequate computing and networking resources to support the indicated SLA value or QoS.

5. The apparatus of claim 1, the identifier comprising a global process address space identifier (GlobalPASID).

6. The apparatus of claim 5, comprising the GlobalPASID to also include a stream identifier to identify an access stream from among a plurality of access streams for the application.

7. The apparatus of claim 1, comprising the SLA or QoS request to also indicate a type of access, the type of access including one of a read access type, a write access type or a read/write access type.

8. The apparatus of claim 1, the circuitry comprising a field programmable gate array (FPGA).

9. The apparatus of claim 1, comprising:
   the one or more storage devices arranged to operate according to one or more Non-Volatile Memory Express (NVMe) Base Specifications including the NVMe Base Specification, revision 1.3;
   the fabric packet including the SLA or QoS request is arranged according to the one or more NVM Express over Fabrics (NVMeoF) Specifications including the NVMeoF Specification, revision 1.0; and
   the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

10. At least one machine readable medium comprising a plurality of instructions that in response to being executed by a system at a client computing node cause the system to:
    receive a service level agreement (SLA) or quality of service (QoS) request from an application hosted by the client computing node, the SLA or QoS request indicating an SLA value or QoS to remotely access one or more storage devices coupled with a target host computing node, the client computing node coupled with the target host computing node through a networking fabric;
    assign an identifier to the application;
    send the SLA or QoS request to the target host computing node in a fabric packet; and
    receive an acknowledgment (ACK) message that includes the identifier and an indication that the SLA or QoS request has been granted.

11. The at least one machine readable medium of claim 10, the SLA value indicated in the SLA or QoS request comprises a guaranteed memory bandwidth to access the one or more storage devices.

12. The at least one machine readable medium of claim 10, the QoS indicated in the SLA or QoS request comprises a class of service that indicates a priority of access to the one or more storage devices as compared to other accesses granted to other applications to access the one or more storage devices.

13. The at least one machine readable medium of claim 10, the instructions to further cause the system to:
assign the identifier to the application responsive to a determination that at least the client computing node has available resources to support the indicated SLA value or QoS, the available resources to include adequate computing and networking resources to support the indicated SLA value or QoS.

14. The at least one machine readable medium of claim 10, comprising:
the one or more storage devices arranged to operate according to one or more Non-Volatile Memory Express (NVMe) Base Specifications including the NVMe Base Specification, revision 1.3;
the fabric packet including the SLA or QoS request is arranged according to the one or more NVM Express over Fabrics (NVMeoF) Specifications including the NVMeoF Specification, revision 1.0; and
the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

15. A controller comprising:
circuitry; and
logic for execution by the circuitry to:
receive a service level agreement (SLA) or quality of service (QoS) request to access at least one storage device of a plurality of storage devices coupled with a target host computing node hosting the controller, the SLA or QoS request included in a first fabric packet routed from a client computing node through a networking fabric coupled with the target host computing node, the SLA or QoS request originating from an application hosted by the client computing node and having an identifier, the SLA or QoS request indicating an SLA value or QoS to access the at least one storage device;
determine that the at least one storage device has available resources to support the indicated SLA value or QoS; and
cause an acknowledgment (ACK) message to be sent to the client computing node in a second fabric packet that is routed through the networking fabric, the ACK message including the identifier and an indication that the SLA or QoS request has been granted.

16. The controller of claim 15, the SLA value indicated in the SLA or QoS request comprises a guaranteed memory bandwidth to access the at least one storage device.

17. The controller of claim 15, the QoS indicated in the SLA or QoS request comprises a class of service that indicates a priority of access to the at least one storage device as compared to other accesses granted to other applications to access the at least one storage device.

18. The controller of claim 15, the logic to determine that the at least one storage device has available resources to support the indicated SLA value or QoS further comprising the logic to:
forward the SLA or QoS request to the at least one storage device; and
receive an indication from the at least one storage device of available resources to support the indicated SLA value or QoS.

19. The controller of claim 15, the logic to determine that the at least one storage device has available resources to support the indicated SLA value or QoS further comprising the logic to:
read one or more machine state registers (MSRs) maintained at the at least one storage device to determine a first percentage of the at least one storage device available to support SLAs and determine a second percentage available to support QoS; and
determine the at least one storage device has available resources to support the indicated SLA value or QoS based on the SLA value not causing the first percentage to be exceeded or the QoS not causing the second percentage to be exceeded.

20. The controller of claim 15, comprising the SLA or QoS request to also indicate a type of access, the type of access including one of a read access type, a write access type or a read/write access type.

21. The controller of claim 15, comprising:
the plurality of storage devices arranged to operate according to one or more Non-Volatile Memory Express (NVMe) Base Specifications including the NVMe Base Specification, revision 1.3;
the controller arranged to operate according to the NVMe Base Specification, revision 1.3 and according to one or more NVM Express over Fabrics (NVMeoF) Specifications including the NVMeoF Specification, revision 1.0;
the fabric packet including the SLA or QoS request and the second fabric packet including the ACK message are arranged according to the one or more NVM Express over Fabrics (NVMeoF) Specifications including the NVMeoF Specification, revision 1.0; and
the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

22. The controller of claim 15, comprising one or more of:
a command bus coupled to the circuitry;
one or more processors coupled to the command bus; and
a host fabric interface communicatively coupled to the circuitry.

23. A method comprising:
receiving, at a controller, a service level agreement (SLA) or quality of service (QoS) request to access at least one storage device of a plurality of storage devices coupled with a target host computing node, the SLA or QoS request included in a first fabric packet routed from a client computing node through a networking fabric coupled with the target host computing node, the SLA or QoS request originating from an application hosted by the client computing node and having an identifier, the SLA or QoS request indicating an SLA value or QoS to access the at least one storage device;
determining that the at least one storage device has available resources to support the indicated SLA value or QoS; and
causing an acknowledgment (ACK) message to be sent to the client computing node in a second fabric packet that is routed through the networking fabric, the ACK message including the identifier and an indication that the SLA or QoS request has been granted.

24. The method of claim 23, the SLA value indicated in the SLA or QoS request comprises a guaranteed memory bandwidth to access the at least one storage device.

25. The method of claim 23, the QoS indicated in the SLA or QoS request comprises a class of service that indicates a priority of access to the at least one storage device as compared to other accesses granted to other applications to access the at least one storage device.

26. The method of claim 23, determining that the at least one storage device has available resources to support the indicated SLA value or QoS further comprising:

forwarding the SLA or QoS request to the at least one storage device; and receiving an indication from the at least one storage device of available resources to support the indicated SLA value or QoS.

27. The method of claim 23, determining that the at least one storage device has available resources to support the indicated SLA value or QoS further comprising:

reading one or more machine state registers (MSRs) maintained at the at least one storage device to determine a first percentage of the at least one storage device available to support SLAs and determine a second percentage available to support QoS; and determining the at least one storage device has available resources to support the indicated SLA value or QoS based on the SLA value not causing the first percentage to be exceeded or the QoS not causing the second percentage to be exceeded.

28. The method of claim 23, comprising the SLA or QoS request also indicating a type of access, the type of access including one of a read access type, a write access type or a read/write access type.

29. The method of claim 23, comprising:

the plurality of storage devices arranged to operate according to one or more Non-Volatile Memory Express (NVMe) Base Specifications including the NVMe Base Specification, revision 1.3;

the controller arranged to operate according to the NVMe Base Specification, revision 1.3 and according to one or more NVM Express over Fabrics (NVMeoF) Specifications including the NVMeoF Specification, revision 1.0;

the SLA or QoS requests included in the first fabric packet is arranged according to the one or more NVMeoF Specifications include the NVMeoF Specification, revision 1.0; and the networking fabric arranged to operate using Fibre Channel communication protocols, InfiniBand communication protocols, Remote Direct Memory Access (RDMA) over Converged Ethernet (RoCE) communication protocols, Internet Wide Area RDMA Protocol (iWARP) communication protocols or transmission control protocol (TCP) communication protocols.

* * * * *